(12) United States Patent
Stockwell et al.

(10) Patent No.: US 11,332,675 B2
(45) Date of Patent: May 17, 2022

(54) REACTIVE SILICA-ALUMINA MATRIX COMPONENT COMPOSITIONS FOR BOTTOMS CRACKING CATALYSTS

(71) Applicant: BASF CORPORATION, Florham Park, NJ (US)

(72) Inventors: David M. Stockwell, Iselin, NJ (US); Junmei Wei, Iselin, NJ (US); Xingtao Gao, Iselin, NJ (US); David H. Harris, Mountainside, NJ (US)

(73) Assignee: BASF Corporation, Florham Park, NJ (US)

( * ) Notice: Subject to any disclaimer, the term of this patent is extended or adjusted under 35 U.S.C. 154(b) by 46 days.

(21) Appl. No.: 16/770,912

(22) PCT Filed: Dec. 10, 2018

(86) PCT No.: PCT/US2018/064738
§ 371 (c)(1),
(2) Date: Jun. 8, 2020

(87) PCT Pub. No.: WO2019/118344
PCT Pub. Date: Jun. 20, 2019

(65) Prior Publication Data
US 2021/0253955 A1    Aug. 19, 2021

Related U.S. Application Data

(60) Provisional application No. 62/597,176, filed on Dec. 11, 2017.

(51) Int. Cl.
| | |
|---|---|
| C10G 11/05 | (2006.01) |
| C10G 11/18 | (2006.01) |
| B01J 21/12 | (2006.01) |
| B01J 21/16 | (2006.01) |
| B01J 29/08 | (2006.01) |
| B01J 35/00 | (2006.01) |
| B01J 35/02 | (2006.01) |
| B01J 35/08 | (2006.01) |
| B01J 35/10 | (2006.01) |
| B01J 37/00 | (2006.01) |
| B01J 37/03 | (2006.01) |
| B01J 37/08 | (2006.01) |
| B01J 37/10 | (2006.01) |

(52) U.S. Cl.
CPC .............. *C10G 11/05* (2013.01); *B01J 21/12* (2013.01); *B01J 21/16* (2013.01); *B01J 29/088* (2013.01); *B01J 35/0006* (2013.01); *B01J 35/023* (2013.01); *B01J 35/08* (2013.01); *B01J 35/1014* (2013.01); *B01J 35/1019* (2013.01); *B01J 35/1038* (2013.01); *B01J 35/1042* (2013.01); *B01J 37/0045* (2013.01); *B01J 37/038* (2013.01); *B01J 37/082* (2013.01); *B01J 37/10* (2013.01); *C10G 11/18* (2013.01); *B01J 2229/18* (2013.01); *C10G 2300/70* (2013.01)

(58) Field of Classification Search
None
See application file for complete search history.

(56) References Cited

U.S. PATENT DOCUMENTS

| | | |
|---|---|---|
| 4,826,793 A | 5/1989 | Velten et al. |
| 5,108,979 A | 4/1992 | Magnabosco et al. |
| 5,422,332 A | 6/1995 | Demmel |
| 5,503,814 A | 4/1996 | Demmel |
| 5,545,604 A | 8/1996 | Demmel |
| 5,618,406 A | 4/1997 | Demmel |
| 6,281,164 B1 | 8/2001 | Demmel et al. |
| 6,358,401 B1 | 3/2002 | Evans |
| 6,479,421 B1 | 11/2002 | Vierheilig |
| 6,506,358 B1 | 1/2003 | Stamires et al. |
| 6,508,930 B1 | 1/2003 | Evans et al. |
| 6,555,496 B1 | 4/2003 | Stamires et al. |
| 6,689,333 B1 | 2/2004 | Stamires et al. |
| 6,859,759 B2 | 5/2005 | Evans |
| 6,929,736 B2 | 8/2005 | Vierheilig |
| 6,974,559 B2 | 12/2005 | Evans |
| 7,050,944 B2 | 5/2006 | Evans |
| 7,112,313 B2 | 9/2006 | Vierheilig |
| 7,208,446 B2 | 4/2007 | Stamires et al. |
| 7,347,929 B2 | 3/2008 | Vierheilig et al. |
| 7,361,264 B2 | 4/2008 | Vierheilig |
| 7,361,319 B2 | 4/2008 | Vierheilig |
| 7,364,708 B2 | 4/2008 | Evans |
| 7,369,959 B2 | 5/2008 | Evans |
| 7,390,396 B2 | 6/2008 | Evans et al. |
| 7,431,825 B2 | 10/2008 | Vierheilig et al. |
| 7,431,894 B2 | 10/2008 | Evans |
| 7,438,863 B2 | 10/2008 | Evans |
| 7,470,406 B2 | 12/2008 | Evans |
| 7,510,647 B2 | 3/2009 | Evans |
| 7,560,078 B2 | 7/2009 | Elliott et al. |
| 7,572,364 B2 | 8/2009 | Evans et al. |
| 7,605,333 B2 | 10/2009 | Elliott et al. |
| 7,606,678 B2 | 10/2009 | Evans |
| 7,632,395 B2 | 12/2009 | Evans |
| 7,815,867 B2 | 10/2010 | Elliott et al. |

(Continued)

OTHER PUBLICATIONS

International Search Report & Written Opinion in International Application No. PCT/US2018/064738, dated Mar. 13, 2019.

*Primary Examiner* — Renee Robinson
(74) *Attorney, Agent, or Firm* — Lowenstein Sandler LLP

(57) ABSTRACT

A bottoms cracking catalyst composition, comprising: about 30 to about 60 wt % alumina; greater than 0 to about 10 wt % of a dopant, measured as the oxide; about 2 to about 20 wt % reactive silica; about 3 to about 20 wt % of a component comprising peptizable boehmite, colloidal silica, aluminum chlorohydrol, or a combination of any two or more thereof; and about 10 to about 50 wt % of kaolin.

21 Claims, 8 Drawing Sheets

(56) References Cited

U.S. PATENT DOCUMENTS

| | | |
|---|---|---|
| 7,842,250 B2 | 11/2010 | Evans |
| 8,092,756 B2 | 1/2012 | Evans et al. |
| 8,097,213 B2 | 1/2012 | Vierheilig et al. |
| 8,099,259 B2 | 1/2012 | Evans |
| 8,146,414 B2 | 4/2012 | Evans et al. |
| 8,197,669 B2 | 6/2012 | Vierheilig |
| 8,236,247 B2 | 8/2012 | Evans et al. |
| 8,444,941 B2 | 5/2013 | Evans et al. |
| 8,673,249 B2 | 3/2014 | Evans et al. |
| 8,728,400 B2 | 5/2014 | Evans et al. |
| 2003/0166453 A1 | 9/2003 | Kuvettu et al. |
| 2012/0329639 A1 | 12/2012 | Shu et al. |
| 2013/0078468 A1 | 3/2013 | Kuvettu et al. |
| 2014/0116923 A1* | 5/2014 | Din ................ C10G 11/05 208/120.25 |

* cited by examiner

REACTIVE SILICA-ALUMINA MATRIX COMPONENT COMPOSITIONS FOR BOTTOMS CRACKING CATALYSTS

CROSS-REFERENCE TO RELATED APPLICATIONS

This application is a U.S. National Phase Application under 35 U.S.C. § 371 of International Application No. PCT/US2018/064738, filed on Dec. 10, 2018, which claims the benefit of priority to U.S. Provisional Patent Application No. 62/597,176, filed on Dec. 11, 2017, the disclosures of which are incorporated herein by reference in their entirety.

FIELD

The present technology is generally related to petroleum refining catalysts. More specifically, the technology is related to bottoms cracking catalysts including alumina, dopant, reactive silica, a component that includes peptizable boehmite, colloidal silica, aluminum chlorohydrol, and kaolin, and methods of making and using such catalysts.

SUMMARY

In one aspect, a bottoms cracking catalyst composition includes about 30 to about 60 wt % alumina; greater than 0 to about 10 wt % of a dopant measured as the oxide; about 2 to about 20 wt % reactive silica; about 3 to about 20 wt % of a component comprising peptizable boehmite, colloidal silica, aluminum chlorohydrol, or a combination of any two or more thereof; and about 10 to about 50 wt % of kaolin. In some embodiments, the dopant is doped onto the alumina, while in others the dopant is mixed with the alumina. Further, the alumina, in some embodiments, may be a calcined alumina.

In another aspect, a method is provided for making a bottoms cracking catalyst, the method including forming an aqueous slurry containing on a dry weight basis, about 30 to about 60 wt % alumina; greater than 0 to about 10 wt % of a dopant measured as the oxide; about 2 to about 20 wt % reactive silica; about 3 to about 20 wt % of a component comprising peptizable boehmite, colloidal silica, aluminum chlorohydrol, or a combination of any two or more thereof; and about 10 to about 50 wt % of kaolin, and spray drying the aqueous slurry to obtain microspheres.

In another aspect, a method is provided for cracking a hydrocarbon feed, the method including contacting the feed with a bottoms cracking catalyst that includes about 30 to about 60 wt % alumina; greater than 0 to about 10 wt % of a dopant, measured as the oxide; about 2 to about 20 wt % reactive silica; about 3 to about 20 wt % of a component comprising peptizable boehmite, colloidal silica, aluminum chlorohydrol, or a combination of any two or more thereof; and about 10 to about 50 wt % of kaolin.

In another aspect, a bottoms cracking catalyst composition includes about 30 to about 60 wt % alumina; greater than 0 to about 10 wt % of a rare earth carbonate; about 2 to about 20 wt % reactive silica; about 3 to about 20 wt % of a component comprising peptizable boehmite, colloidal silica, aluminum chlorohydrol, or a combination of any two or more thereof; and about 10 to about 50 wt % of kaolin. The rare earth may be ytterbium, gadolinium, cerium, lanthanum, yttrium, or a mixture of any two or more thereof.

In another aspect, a method is provided for making a bottoms cracking catalyst, the method including forming an aqueous slurry containing on a dry weight basis, about 30 to about 60 wt % alumina; greater than 0 to about 10 wt % of a rare earth carbonate; about 2 to about 20 wt % reactive silica; about 3 to about 20 wt % of a component comprising peptizable boehmite, colloidal silica, aluminum chlorohydrol, or a combination of any two or more thereof; and about 10 to about 50 wt % of kaolin, and spray drying the aqueous slurry to obtain microspheres. The rare earth may be ytterbium, gadolinium, cerium, lanthanum, yttrium, or a mixture of any two or more thereof.

In another aspect, a method is provided for cracking a hydrocarbon feed, the method including contacting the feed with a bottoms cracking catalyst that includes about 30 to about 60 wt % alumina; greater than 0 to about 10 wt % of a dopant, measured as the oxide; about 2 to about 20 wt % reactive silica; about 3 to about 20 wt % of a component comprising peptizable boehmite, colloidal silica, aluminum chlorohydrol, or a combination of any two or more thereof; and about 10 to about 50 wt % of kaolin. The rare earth may be ytterbium, gadolinium, cerium, lanthanum, yttrium, or a mixture of any two or more thereof.

In another aspect, a bottoms cracking catalyst composition includes about 10 to about 20 wt % of a rare earth exchanged Y zeolite; about 10 to about 30 wt % of a binder comprising silica and boehmite; about 30 to about 60 wt % of an additive comprising alumina and, optionally, crystalline boehmite; and about 10 to about 50 wt % of kaolin. In such embodiments, the rare earth exchanged Y zeolite may include ytterbium, gadolinium, cerium, lanthanum, yttrium, or a mixture of any two or more thereof. In some embodiments, the rare earth exchanged Y zeolite includes lanthanum. In such embodiments, the catalyst may have an average particle size of about 70-95 microns. In such embodiments, the catalyst may have a mercury pore volume of 0.3-0.56 cc/g in a diameter range from 4 to 2,000 nm.

In another aspect, a method of making bottoms cracking catalyst includes forming an aqueous slurry containing on a dry weight basis, about 10 to about 20 wt % of a rare earth exchanged Y zeolite; about 10 to about 30 wt % of a binder comprising silica and boehmite; about 30 to about 60 wt % of an additive comprising alumina and, optionally, crystalline boehmite; and about 10 to about 50 wt % of kaolin; and spray-drying the aqueous slurry to obtain microspheres. The method may further include calcining the microspheres.

In another aspect, a method of cracking a hydrocarbon feed includes contacting the feed with any of the above bottoms cracking catalysts. Such methods may result in a greater than 10% lower coke yield measured at 13 wt % bottoms, when compared to contacting the feed with a catalyst exhibiting equivalent physical properties but which catalyst does not include the bottoms cracking catalyst.

DETAILED DESCRIPTION

Figure 1:
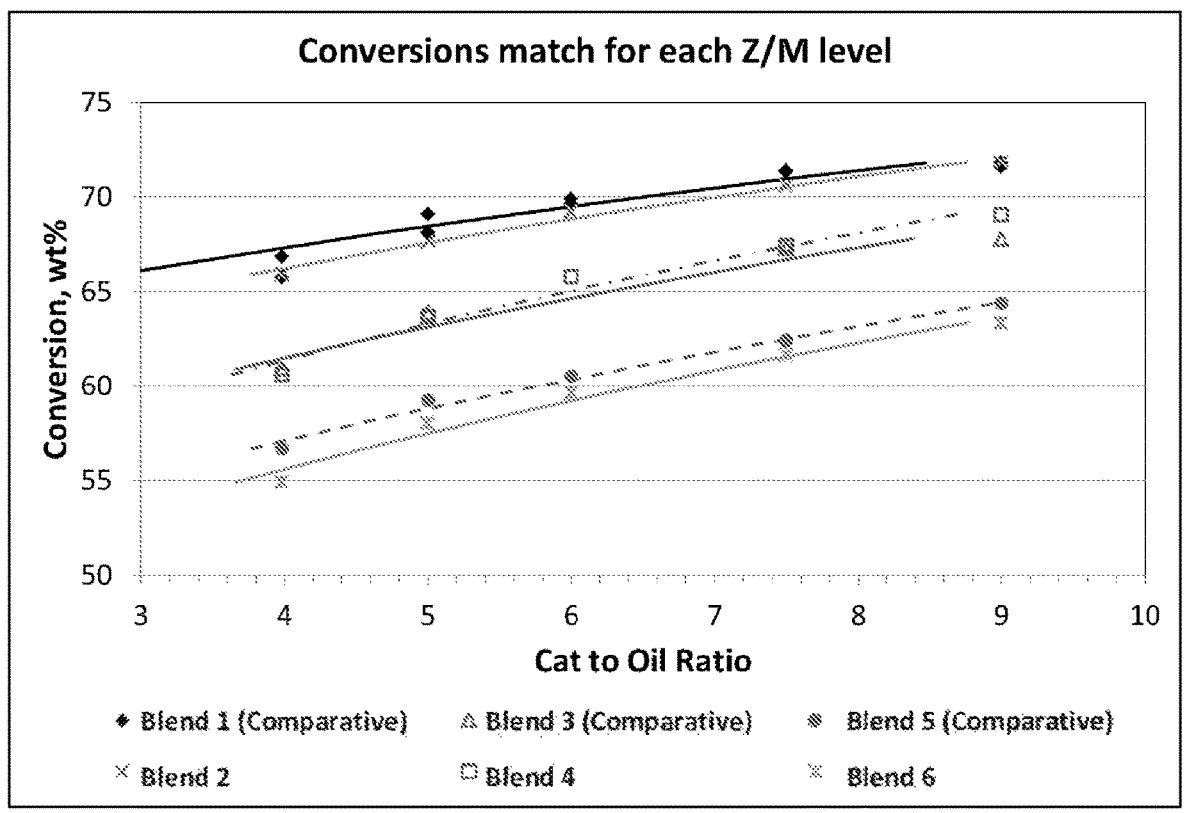
FIG. 1 illustrates the catalytic product conversion for the example catalyst blends (Blends 2, 4, and 6) and comparative catalyst blends (Blends 1, 3, and 5), as described in Example 2.

Various embodiments are described hereinafter. It should be noted that the specific embodiments are not intended as an exhaustive description or as a limitation to the broader aspects discussed herein. One aspect described in conjunction with a particular embodiment is not necessarily limited to that embodiment and can be practiced with any other embodiment(s).

As used herein, "about" will be understood by persons of ordinary skill in the art and will vary to some extent depending upon the context in which it is used. If there are uses of the term which are not clear to persons of ordinary skill in the art, given the context in which it is used, "about" will mean up to plus or minus 10% of the particular term.

The use of the terms "a" and "an" and "the" and similar referents in the context of describing the elements (especially in the context of the following claims) are to be construed to cover both the singular and the plural, unless otherwise indicated herein or clearly contradicted by context. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the embodiments and does not pose a limitation on the scope of the claims unless otherwise stated. No language in the specification should be construed as indicating any non-claimed element as essential.

Product values for refinery products like gasoline, light olefins and light cycle oil vary with time and/or location, but these are always more valued than bottoms fractions. Refiners require catalyst options that will maximize each of these valued fractions while minimizing yields of low value bottoms, so that they can adjust equilibrium catalyst composition at any time to maximize profitability. It is understood that zeolite cracking maximizes gasoline, while matrix cracking maximizes light olefins and light cycle oil (LCO). The present inventors have now developed catalyst additives that crack bottoms with minimal coking, and with selectivity needed to maximize LCO (diesel) and light olefins for refineries. Moreover, the inventors of the technology described herein have found the bottoms cracking catalyst composition exhibits surprisingly lower coke selectivity and has an easier preparation.

Provided herein is a bottoms cracking catalyst composition, methods of making a bottoms cracking catalyst composition, and methods of cracking a hydrocarbon feed. The composition includes a dopant-stabilized alumina. The dopant may include a rare earth metal, measured as the oxide. While some embodiments contemplate the use of the bottoms cracking catalyst composition with zeolites, other embodiments are presented that contain little or no zeolite.

In one aspect, a bottoms cracking catalyst composition is provided that includes, about 30 to about 60 wt % alumina; greater than 0 to about 10 wt % of a dopant, measured as the oxide; about 2 to about 20 wt % reactive silica; about 3 to about 20 wt % of a component comprising peptizable boehmite, colloidal silica, aluminum chlorohydrol, or a combination of any two or more thereof; and about 10 to about 50 wt % of kaolin. In some embodiments, the dopant is doped onto the alumina, while in others the dopant is mixed with the alumina. Further, the alumina, in some embodiments, may be a calcined alumina.

The bottoms cracking catalyst composition includes about 30 to about 60 wt % alumina. This may include, but is not limited to, about 30 wt %, about 35 wt %, about 40 wt %, about 45 wt %, about 50 wt %, about 55 wt %, about 60 wt %, or a range between any two of these values. In some embodiments, the amount of alumina includes from about 30 to about 60 wt. %, from about 35 to about 55 wt %, from about 40 to about 55 wt %, or from about 45 to about 55 wt %. Suitable types of alumina include, but are not limited to, $\gamma$-$Al_2O_3$, $\eta$-$Al_2O_3$, $\delta$-$Al_2O_3$, $\theta$-$Al_2O_3$, $\kappa$-$Al_2O_3$, and a combination of any two or more thereof.

The bottoms cracking catalyst composition may contain a dopant-stabilized alumina. In some embodiments, the alumina is doped with the dopant by impregnating into or coating onto or co-precipitating with the alumina.

In some embodiments, the bottoms cracking catalyst composition having the dopant-stabilized alumina includes greater than 0 wt % to about 10 wt % of the dopant, when measured as the oxide. Suitable amounts of dopant include, but are not limited to, greater than 0 to about 10 wt. %, 0.01 wt % to about 7 wt %, about 0.1 wt % to about 5 wt %, or about 0.5 wt % to about 4 wt %. In some embodiments, the dopant is present in an amount of about 4 wt %.

The dopant may be a rare earth or an alkaline earth metal oxide. For example, the dopant, measured as the oxide, may include ytterbium, gadolinium, cerium, lanthanum, yttrium, barium, magnesium, or a mixture of any two or more thereof. In some embodiments, the dopant is lanthanum. Without being bound by theory, it is believed that the rare earth materials modify the acid site density in the catalyst, thereby reducing coke selectivity.

In some embodiments, the bottoms cracking catalyst composition includes about 2 to about 20 wt % reactive silica. For example, suitable amounts of reactive silica include, but are not limited to, about 2 to about 20 wt %, about 5 to 15 wt %, or about 7 to about 12 wt %. Suitable types of reactive silica include, but is not limited to, colloidal silica, precipitated $SiO_2$, $SiO_2$ gel, high surface area silica that can volatilize, zeolites, or combinations of two or more thereof. Without being bound by theory, it is believed that the reactive silica provides, the Si needed to create Brönsted acid sites, while reducing, or eliminating, the Lewis acid sites that make coke.

The bottoms cracking catalyst composition includes about 3 wt % to about 20 wt % of a component that includes peptizable boehmite, colloidal silica, aluminum chlorohydrol, or a combination of any two or more thereof. In some embodiments, the component includes colloidal silica and peptizable boehmite. Suitable amounts of the component include, but are not limited to, about 3 wt %, about 5 wt %, about 7 wt %, about 10 wt %, about 12 wt %, about 15 wt %, about 18 wt %, about 20 wt %, or a range between any of these values. In some embodiments, the component is present in an amount from about 3 to about 18 wt %, about 5 to about 15 wt %, about 7 to about 12 wt %. In some embodiments, the component includes about 5 to about 10 wt % boehmite and about 5 to 15 wt % colloidal silica.

The bottoms cracking catalyst composition includes about 10 wt % to about 50 wt % of kaolin. For example, suitable amounts of kaolin include, but are not limited to, about 10 wt %, about 15 wt %, about 20 wt %, about 25 wt %, about 30 wt %, about 35 wt %, about 40 wt %, about 45 wt %, about 50 wt %, or ranges between any two of these values. In some embodiments, the amount of kaolin present includes from about 10 to about 50 wt %, about 15 to about 45 wt %, or about 20 to about 30 wt %. In some embodiments, the kaolin includes metakaolin (kaolin calcined to undergo a strong endothermic reaction associated with dehydroxylation) and kaolin calcined under conditions more severe than those used to convert kaolin to metakaolin, i.e., kaolin calcined to undergo the characteristic kaolin exothermic reaction, sometimes referred to as the spinel form of calcined kaolin.

The bottoms cracking catalyst composition described herein in any embodiment has an average particle size of about 70 to about 95 microns. For example, suitable particle sizes include, but are not limited to, about 70 microns, about 75 microns, about 80 microns, about 85 microns, about 90 microns, about 95 microns, and ranges between any two of these values. In some embodiments, the particle size includes from about 70 to about 95 microns, about 70 to about 85 microns, or about 70 to about 80 microns.

The bottoms cracking catalyst composition described herein in any embodiment has a mercury pore volume of 0.3 to 0.56 cc/g in a diameter range from 4 to 2,000 nm. For example, suitable mercury pore volume amounts include 0.30 cc/g, 0.35 cc/g, 0.40 cc/g, 0.45 cc/g, 0.50 cc/g, 0.56 cc/g, or ranges between any two of these values. In some embodiments the mercury pore volume includes amounts from 0.3 to 0.56 cc/g, from 0.40 to 0.56 cc/g, or 0.45 to 0.56 cc/g.

The bottoms cracking catalyst described herein in any embodiment has a BET ("Brunauer-Emmett-Teller") surface area from about 100 to about 200 m$^2$/g. For example, the BET surface area includes, but is not limited to, from about 100 to about 200 m$^2$/g, about 125 to about 190 m$^2$/g, or about 150 to about 180 m$^2$/g.

The bottoms cracking catalyst composition described herein in any embodiment may further include a zeolite. For example, suitable zeolites include, but are not limited to, Y zeolite, Ultrastable Y, Dealuminated Y (DeAl Y), Ultrahydrophobic Y (UHPY), dealuminated silicon-enriched zeolites (e.g., LZ-210), ZSM-5, ZSM-20, zeolite L, naturally occurring zeolites (e.g., faujasite, mordenite and the like), zeolite beta, and the like, and any combination of two or more thereof. In some embodiments, the zeolite is Y zeolite, or a rare-earth exchanged Y zeolite.

According to any embodiment, unless expressly including a zeolite, the bottoms cracking catalyst composition may be essentially free or free of zeolite. As used herein, "essentially free" of zeolite refers to having from 0 wt % to about 10 wt % zeolite present in the bottoms cracking catalyst. In some embodiments, essentially free of zeolite includes from 0 wt % to about 5 wt %, from 0 wt % to about 2 wt %, from 0 wt % to about 1 wt %, from 0 wt % to about 0.5 wt %, from 0 wt % to about 0.05 wt %, or from 0 wt % to about 0.01 wt % of zeolite present in the bottoms cracking catalyst. In some embodiments, the bottoms cracking catalyst is zeolite-free. For example, the bottoms cracking catalyst has 0 wt % zeolite.

With respect to the binder constituents, colloidal silica and peptizable pseudo-boehmite may be used such as Catapal or Disperal products for the boehmite, or small particle size colloidal silica or polysilicic acid for the colloidal silica, the former otherwise known as ammonium polysilicate. It is known that for these colloidal or polymeric species, small particle size is preferred. For the SiO$_2$, less than 50 Å is preferred, and most preferred is freshly prepared (poly) silicic acid. The foregoing binder system is advantageous in that it is essentially free of sodium and the like. Accordingly, in any of the above embodiments, the compositions may be essentially free of, or free of sodium. As used herein, essentially free of sodium will refer to compositions with less than 0.5 wt % sodium. It is also well known in the art to bind FCC catalysts with aluminum-stabilized colloidal silica prepared by rapidly mixing together sodium silicate and alum in sulfuric acid, but this system contains sodium and so is less preferred, but does contain silica, and thus can be expected to function equivalently to the most preferred composition.

More generally, since the preferred binder system contains no sodium, ion exchange and other processes can be avoided and the (calcined) spray dryer product is a final product. This means that the inventive catalyst is a useful vehicle for incorporating other known functionalities commonly used in catalytic cracking. Thus, minor amounts of rare earth- or alkaline earth-based vanadium traps, or of refractory oxide-supported precious metal CO oxidation or NOx reduction catalysts and oxygen storage compounds already known for washcoating onto monolithic supports for emission controls, or minor amounts of known SO$_x$ oxidation or adsorbents all can be added to the current formulation to obtain results as expected by one skilled in the art. ZSM-5 or other zeolites might also be added as described herein.

In another aspect, a method of making bottoms cracking catalyst as described herein in any embodiment is provided. The method of making a bottom cracking catalyst includes forming an aqueous slurry containing on a dry weight basis, about 30 to about 60 wt % alumina; greater than 0 to about 10 wt % of a dopant, measured as the oxide; about 2 to about 20 wt % reactive silica; about 3 to about 20 wt % of a component that includes peptizable boehmite, colloidal silica, aluminum chlorohydrol, or a combination of any two or more thereof; and about 10 to about 50 wt % of kaolin, and spray drying the aqueous slurry to obtain microspheres. In some embodiments, the dopant is doped onto the alumina, while in others the dopant is mixed with the alumina. Further, the alumina, in some embodiments, may be a calcined alumina.

The methods described herein include forming the aqueous slurry containing alumina doped with a dopant measured as the oxide, reactive silica, a component that includes peptizable boehmite, colloidal silica, aluminum chlorohydrol, or a combination of any two or more thereof, and kaolin as described herein in any embodiment. For example, forming the aqueous slurry may include wet milling the doped or undoped alumina to improve attrition resistance.

Other granular ingredients, such as zeolites or additives, may also be milled. A combination of granular ingredients may be pre-mixed and then milled together. In some embodiments, suitable milling particle size targets include 90% below 3 microns. Typically, gibbsite, bayerite and calcined aluminas are easily milled. Peptizable or partially peptizable boehmites may be difficult or unnecessary to mill.

In some embodiments, peptizing of boehmites or pseudo-boehmites will arrive at the particle size target, including but not limited to, 90% below 3 microns. In some embodiments, the individual components may be made down and milled together or separately, and mixed easily in any order at acidic pH. In some embodiments, the method includes adding colloidal $SiO_2$ last. For example, the colloidal $SiO_2$ may have a basic pH, and thus react with peptized alumina in the slurry. In some instances, the slurry thickens and may gel as the $SiO_2$ raises the overall pH of the mixture. In some embodiments, the colloidal $SiO_2$ is Nalco 2326 $SiO_2$, and the peptizable boehmite is PB-950 Catapal A, or Catapal B.

In some embodiments, the forming is conducted at acidic pH conditions. In some embodiments, the forming is conducted at about pH 5, about pH 4, about pH 3, about pH 2.5, about pH 2, or ranges between any two of these values.

In some embodiments, forming the aqueous slurry is conducted at a temperature of at least about 10° C. For example, suitable temperatures include, but are not limited to, about 10° C., 15° C., 20° C., 25° C., 30° C., 35° C., 40° C., 45° C., 50° C., 55° C., 60° C., 65° C., 70° C., 75° C., 80° C., 85° C., 90° C., 95° C., or 100° C., or ranges between any two of these values.

Following formation of the aqueous slurry, the method includes spray drying the aqueous slurry to obtain microspheres. In some embodiments, the microspheres include a particle size, BET surface area, and/or a mercury pore volume as described herein in any embodiment. For example, the microspheres include a particle size from about 70 to about 95 microns, a BET surface area from about 100 to about 200 $m^2/g$, and a mercury pore volume from 0.3 to 0.56 cc/g.

The methods described herein may further include static calcination of the microspheres. In some embodiments, the calcining is conducted at a temperature from about 400° C. to about 850° C. Suitable temperatures for calcining the microspheres includes, but are not limited to, the calcining is conducted at a temperature of from about 400° C. to about 850° C., from about 480° C. to about 740° C., from about 500° C. to about 650° C., or from about 600° C. to about 700° C. In some embodiments, the calcining is conducted at a temperature of about 400° C., 500° C., 525° C., 550° C., 575° C., 600° C., 625° C., 650° C., 675° C., 700° C., 725° C., 750° C., 775° C., 800° C., 825° C., or 850° C., or ranges between any two of these values.

In some embodiments, the static calcination is conducted for at least about 15 minutes ("min"). For example, suitable periods for calcining include, but are not limited to at least about 15 min, at least about 30 min, at least about 1 hour, or at least about 2 hours. In some embodiments, the calcining is conducted from about 15 min to about 5 hours, about 45 min to about 3 hours, or about 1 hour to about 2 hours.

In some embodiments, the calcination is conducted in a rotary calciner. Rotary calcination may include residence times from about 1 min to about 1 hour. For example, suitable rotary calcination residence times include, but are not limited to about 1 min to about 1 hour, about 5 min to about 30 min, about 10 min to about 20 min. Rotary calcination may be carried out at temperatures described herein for static calcination. For example, suitable rotary calcination temperatures may be from about 400° C. to about 850° C., from about 480° C. to about 740° C., from about 500° C. to about 650° C., or from about 600° C. to about 700° C.

In another related aspect, a method of cracking a hydrocarbon feed is provided that includes contacting said feed with a bottoms cracking catalyst. Any of the bottoms cracking catalysts described herein in any embodiment can be used in the catalytic cracking of the hydrocarbon feed.

The method of cracking a hydrocarbon feed includes contacting said hydrocarbon feed with a bottoms cracking catalyst that includes about 30 to about 60 wt % alumina; greater than 0 to about 10 wt % of a dopant, measured as the oxide; about 2 to about 20 wt % reactive silica; about 3 to about 20 wt % of a component including peptizable boehmite, colloidal silica, aluminum chlorohydrol, or a combination of any two or more thereof; and about 10 to about 50 wt % of kaolin.

Cracking of the hydrocarbon feed according to the methods described herein results in at least 10% lower coke yield at 13 wt % bottoms, when compared to contacting the feed with a catalyst having equivalent physical properties which does not include the bottoms cracking catalyst.

The method further includes adding a zeolitic cracking component to the bottoms cracking catalyst to form a blend of catalysts. For example, suitable zeolitic cracking components include a zeolite as described herein. In some embodiments, the zeolitic cracking component is Y zeolite. The ratio of the zeolitic cracking component to the bottoms cracking component may be varied as needed for various gas oil or resid feeds. The zeolite cracking component may be any known zeolitic FCC catalyst. Particularly useful combinations include the blending of the bottoms cracking catalyst with zeolite-rich, high activity FCC catalysts with a steamed ZSA/MSA (zeolite surface area/matrix surface area) ratio above about 2. Blends including similar parts of these high zeolite catalysts with the bottoms cracking catalyst can yield lower activity formulations with ZSA/MSA values between 0.5 and about 1. A virtue of such formulations is that their lower activity can substantially reduce the FCC regenerator temperature in addition to increasing bottoms cracking and light olefins production. Cooling the regenerator is particularly useful in resid feed applications, as this may avoid metallurgical limitations on operations, as well as reducing the deactivation rate of the catalyst. Examples of useful high activity catalysts include those as described in U.S. Pat. Nos. 6,656,347; 6,942,784; and 6,673,235, among others.

In some embodiments, the method of cracking a hydrocarbon feed includes a bottoms cracking catalyst that is zeolite-free.

Provided herein, in another aspect, is a bottoms cracking catalyst composition, methods of making a bottoms cracking catalyst composition, and methods of cracking a hydrocarbon feed. The composition may include a rare earth carbonate. The rare earth carbonate may be ytterbium carbonate, gadolinium carbonate, cerium carbonate, lanthanum carbonate, yttrium carbonate, or a mixture of any two or more thereof. In such embodiments, the bottoms cracking catalyst composition may include a zeolite, while in other embodiments, the bottoms cracking catalyst may contain little or no zeolite.

In one aspect, a bottoms cracking catalyst composition is provided that includes, about 30 to about 60 wt % alumina; greater than 0 to about 10 wt % of a rare earth carbonate; about 2 to about 20 wt % reactive silica; about 3 to about 20 wt % of a component comprising peptizable boehmite, colloidal silica, aluminum chlorohydrol, or a combination of any two or more thereof; and about 10 to about 50 wt % of kaolin. In some embodiments, the dopant is doped onto the alumina, while in others the dopant is mixed with the alumina. Further, the alumina, in some embodiments, may be a calcined alumina.

The bottoms cracking catalyst composition includes about 30 to about 60 wt % alumina. This may include, but is not limited to, about 30 wt %, about 35 wt %, about 40 wt %, about 45 wt %, about 50 wt %, about 55 wt %, about 60 wt %, or a range between any two of these values. In some embodiments, the amount of alumina includes from about 30 to about 60 wt. %, from about 35 to about 55 wt %, from about 40 to about 55 wt %, or from about 45 to about 55 wt %. Suitable types of alumina include, but are not limited to, $\gamma$-$Al_2O_3$, $\eta$-$Al_2O_3$, $\delta$-$Al_2O_3$, $\theta$-$Al_2O_3$, $\kappa$-$Al_2O_3$, and a combination of any two or more thereof.

In some embodiments, the rare earth carbonate is present in the bottoms cracking catalyst from greater than 0 wt % to about 10 wt %. Suitable amounts of rare earth carbonate include, but are not limited to, greater than 0 to about 10 wt. %, 0.01 wt % to about 7 wt %, about 0.1 wt % to about 5 wt %, or about 0.5 wt % to about 4 wt %. In some embodiments, the rare earth carbonate is present in an amount of about 4 wt %.

The rare earth carbonate may be ytterbium carbonate, gadolinium carbonate, cerium carbonate, lanthanum carbonate, yttrium carbonate, or a mixture of any two or more thereof. In some embodiments, the rare earth carbonate is lanthanum carbonate. In other embodiments, the rare earth carbonate may be cerium carbonate.

In some embodiments, the bottoms cracking catalyst composition includes about 2 to about 20 wt % reactive silica. For example, suitable amounts of reactive silica include, but are not limited to, about 2 to about 20 wt %, about 5 to 15 wt %, or about 7 to about 12 wt %. Suitable types of reactive silica include, but is not limited to, colloidal silica, precipitated $SiO_2$, $SiO_2$ gel, high surface area silica that can volatilize, zeolites, or combinations of two or more thereof. Without being bound by theory, it is believed that the reactive silica provides, the Si needed to create Brönsted acid sites, while reducing, or eliminating, the Lewis acid sites that make coke.

The bottoms cracking catalyst composition includes about 3 wt % to about 20 wt % of a component that includes peptizable boehmite, colloidal silica, aluminum chlorohydrol, or a combination of any two or more thereof. In some embodiments, the component is colloidal silica, and peptizable boehmite. Suitable amounts of the component include, but are not limited to, about 3 wt %, about 5 wt %, about 7 wt %, about 10 wt %, about 12 wt %, about 15 wt %, about 18 wt %, about 20 wt %, or a range between any of these values. In some embodiments, the component is present in an amount from about 3 to about 18 wt %, about 5 to about 15 wt %, about 7 to about 12 wt %.

The bottoms cracking catalyst composition includes about 10 wt % to about 50 wt % of kaolin. For example, suitable amounts of kaolin include, but are not limited to, about 10 wt %, about 15 wt %, about 20 wt %, about 25 wt %, about 30 wt %, about 35 wt %, about 40 wt %, about 45 wt %, about 50 wt %, or ranges between any two of these values. In some embodiments, the amount of kaolin present includes from about 10 to about 50 wt %, about 15 to about 45 wt %, or about 20 to about 30 wt %. In some embodiments, the kaolin includes metakaolin (kaolin calcined to undergo a strong endothermic reaction associated with dehydroxylation) and kaolin calcined under conditions more severe than those used to convert kaolin to metakaolin, i.e., kaolin calcined to undergo the characteristic kaolin exothermic reaction, sometimes referred to as the spinel form of calcined kaolin.

The bottoms cracking catalyst composition described herein in any embodiment has an average particle size of about 70 to about 95 microns. For example, suitable particle sizes include, but are not limited to, about 70 microns, about 75 microns, about 80 microns, about 85 microns, about 90 microns, about 95 microns, and ranges between any two of these values. In some embodiments, the particle size includes from about 70 to about 95 microns, about 70 to about 85 microns, or about 70 to about 80 microns.

The bottoms cracking catalyst composition described herein in any embodiment may have a mercury pore volume of 0.3 to 0.56 cc/g in a diameter range from 4 to 2,000 nm. For example, suitable mercury pore volume amounts include 0.30 cc/g, 0.35 cc/g, 0.40 cc/g, 0.45 cc/g, 0.50 cc/g, 0.56 cc/g, or ranges between any two of these values. In some embodiments the mercury pore volume includes amounts from 0.3 to 0.56 cc/g, from 0.40 to 0.56 cc/g, or 0.45 to 0.56 cc/g. If the alumina component is a granular aluminum oxide, or a non-peptizable or only partially peptizable hydrated alumina, then the mercury pore size distribution will include macroporosity. If, instead, the alumina is fully or largely peptizable, the bottoms cracking catalyst will have little or no macroporosity. Surprisingly, it has been found that to enhance the bottoms cracking for gas oil feeds, macroporosity is not required and mainly or fully peptizable boehmites are effective.

The bottoms cracking catalyst described herein in any embodiment may have a BET surface area from about 100 to about 200 $m^2/g$. For example, the BET surface area includes, but is not limited to, from about 100 to about 200 $m^2/g$, about 125 to about 190 $m^2/g$, or about 150 to about 180 $m^2/g$. And, while the as-produced surface area is useful to define the invention, steamed surface areas are more indicative of their value in the refinery. Steaming conditions used include 1450° F./24 h in 100% steam, or 1600° F./4 h in 100% steam, which produce similar results. After 1600° F./4 h steamings, particularly preferred La-stabilized aluminas at 50% loading yield surface areas of about 100 m2/g. Partially or fully peptizable boehmites on the other hand are found to yield steamed surface areas of 120 to 140 m2/g, and also have specific cracking activities 10-20% higher than the La-doped gamma aluminas. The lower activity per unit surface area of the La-doped aluminas is consistent with the role of the La as a site blocker. Surprisingly however, the coke selectivity of the boehmites continues to be acceptable. La carbonate can be added to these latter formulations without excessive loss of specific activity, while enhancing overall catalyst activity by trapping vanadium.

The bottoms cracking catalyst composition described herein in any embodiment may further include a zeolite. For example, suitable zeolites include, but are not limited to, Y zeolite, Ultrastable Y, Dealuminated Y (DeAl Y), Ultrahydrophobic Y (UHPY), dealuminated silicon-enriched zeolites (e.g., LZ-210), ZSM-5, ZSM-20, zeolite L, naturally occurring zeolites (e.g., faujasite, mordenite and the like), zeolite beta, and the like, and any combination of two or more thereof. In some embodiments, the zeolite is Y zeolite, or a rare-earth exchanged Y zeolite. The amount of zeolite may range from 0 to about 10 wt % of the composition.

According to any embodiment, and unless expressly instructed to include a zeolite, the bottoms cracking catalyst composition may be essentially free of, or free of, zeolite, unless composition is expressly stated to include a zeolite. As used herein, "essentially free" of zeolite refers to having from 0 wt % to about 10 wt % zeolite present in the bottoms cracking catalyst. In some embodiments, essentially free of zeolite includes from 0 wt % to about 5 wt %, from 0 wt % to about 2 wt %, from 0 wt % to about 1 wt %, from 0 wt % to about 0.5 wt %, from 0 wt % to about 0.05 wt %, or from 0 wt % to about 0.01 wt % of zeolite present in the bottoms cracking catalyst. In some embodiments, the bottoms cracking catalyst is zeolite-free. For example, the bottoms cracking catalyst has 0 wt % zeolite.

With respect to the binder constituents, colloidal silica and peptizable pseudo-boehmite may be used such as Catapal or Disperal products for the boehmite, or small particle size colloidal silica or polysilicic acid for the colloidal silica, the former otherwise known as ammonium polysilicate. It is known that for these colloidal or polymeric species, small particle size is preferred. For the $SiO_2$, less than 50 Å is preferred, and most preferred is freshly prepared (poly) silicic acid. The foregoing binder system is advantageous in that it is essentially free of sodium and the like. Accordingly, in any of the above embodiments, the compositions may be essentially free of, or free of sodium. As used herein, essentially free of sodium will refer to compositions with less than 0.5 wt % sodium. It is also well known in the art to bind FCC catalysts with aluminum-stabilized colloidal silica prepared by rapidly mixing together sodium silicate and alum in sulfuric acid, but this system contains sodium and so is less preferred, but does contain silica, and thus can be expected to function equivalently to the most preferred composition.

More generally, since the preferred binder system contains no sodium, ion exchange and other processes can be avoided and the (calcined) spray dryer product is a final product. This means that the inventive catalyst is a useful vehicle for incorporating other known functionalities commonly used in catalytic cracking. Thus, minor amounts of rare earth- or alkaline earth-based vanadium traps, or of refractory oxide-supported precious metal CO oxidation or NOx reduction catalysts and oxygen storage compounds already known for washcoating onto monolithic supports for emission controls, or minor amounts of known $SO_x$ oxidation or adsorbents all can be added to the current formulation to obtain results as expected by one skilled in the art.

In another aspect, a method of making bottoms cracking catalyst as described herein in any embodiment is provided. The method of making a bottom cracking catalyst includes forming an aqueous slurry containing on a dry weight basis, about 30 to about 60 wt % alumina; greater than 0 to about 10 wt % of a rare earth carbonate; about 2 to about 20 wt % reactive silica, wherein about 3 to about 20 wt % of a component that includes peptizable boehmite, colloidal silica, aluminum chlorohydrol, or a combination of any two or more thereof; and about 10 to about 50 wt % of kaolin, and spray drying the aqueous slurry to obtain microspheres. In the methods, the dopant may be doped onto the alumina.

The methods described herein include forming the aqueous slurry containing alumina, the rare earth carbonate, reactive silica, a component that includes peptizable boehmite, colloidal silica, aluminum chlorohydrol, or a combination of any two or more thereof, and kaolin as described herein in any embodiment. For example, forming the aqueous slurry may include wet milling the alumina to improve attrition resistance.

Other granular ingredients, may also be milled. A combination of granular ingredients may be pre-mixed and then milled together. In some embodiments, suitable milling particle size targets include 90% below 3 microns. Typically, gibbsite, bayerite and calcined aluminas are easily milled. Peptizable or partially peptizable boehmites may be difficult or unnecessary to mill. In some embodiments, peptizing of boehmites or pseudo-boehmites will arrive at the particle size target, including but not limited to, 90% below 3 microns. In some embodiments, the individual components may be made down and milled together or separately, and mixed easily in any order at acidic pH. In some embodiments, the method includes adding colloidal $SiO_2$ last. For example, the colloidal $SiO_2$ may have a basic pH, and thus react with peptized alumina in the slurry. In some instances, the slurry thickens and may gel as the $SiO_2$ raises the overall pH of the mixture. In some embodiments, the colloidal $SiO_2$ is Nalco 2326 $SiO_2$, and the peptizable boehmite is PB-950 Catapal A, or Catapal B.

In some embodiments, the forming is conducted at acidic pH conditions. In some embodiments, the forming is conducted at about pH 5, about pH 4, about pH 3, about pH 2.5, about pH 2, or ranges between any two of these values.

In some embodiments, forming the aqueous slurry is conducted at a temperature of at least about 10° C. For example, suitable temperatures include, but are not limited to, about 10° C., 15° C., 20° C., 25° C., 30° C., 35° C., 40° C., 45° C., 50° C., 55° C., 60° C., 65° C., 70° C., 75° C., 80° C., 85° C., 90° C., 95° C., or 100° C., or ranges between any two of these values.

Following formation of the aqueous slurry, the method includes spray drying the aqueous slurry to obtain microspheres. In some embodiments, the microspheres include a particle size, BET surface area, and/or a mercury pore volume as described herein in any embodiment. For example, the microspheres include a particle size from about 70 to about 95 microns, a BET surface area from about 100 to about 200 m$^2$/g, and a mercury pore volume from 0.3 to 0.56 cc/g.

The methods described herein may further include static calcination of the microspheres. In some embodiments, the calcining is conducted at a temperature from about 400° C. to about 850° C. Suitable temperatures for calcining the microspheres includes, but are not limited to, the calcining is conducted at a temperature of from about 400° C. to about 850° C., from about 480° C. to about 740° C., from about 500° C. to about 650° C., or from about 600° C. to about 700° C. In some embodiments, the calcining is conducted at a temperature of about 400° C., 500° C., 525° C., 550° C., 575° C., 600° C., 625° C., 650° C., 675° C., 700° C., 725° C., 750° C., 775° C., 800° C., 825° C., or 850° C., or ranges between any two of these values.

In some embodiments, the static calcination is conducted for at least about 15 minutes ("min"). For example, suitable periods for calcining include, but are not limited to at least about 15 min, at least about 30 min, at least about 1 hour, or at least about 2 hours. In some embodiments, the calcining is conducted from about 15 min to about 5 hours, about 45 min to about 3 hours, or about 1 hour to about 2 hours.

In some embodiments, the calcination is conducted in a rotary calciner. Rotary calcination may include residence times from about 1 min to about 1 hour. For example, suitable rotary calcination residence times include, but are not limited to about 1 min to about 1 hour, about 5 min to about 30 min, about 10 min to about 20 min. Rotary calcination may be carried out at temperatures described herein for static calcination. For example, suitable rotary calcination temperatures may be from about 400° C. to about 850° C., from about 480° C. to about 740° C., from about 500° C. to about 650° C., or from about 600° C. to about 700° C.

In another related aspect, a method of cracking a hydrocarbon feed is provided that includes contacting said feed with a bottoms cracking catalyst. Any of the bottoms cracking catalysts described herein in any embodiment can be used in the catalytic cracking of the hydrocarbon feed.

The method of cracking a hydrocarbon feed includes contacting said hydrocarbon feed with a bottoms cracking catalyst that includes about 30 to about 60 wt % alumina; greater than 0 to about 10 wt % of a rare earth carbonate, measured as the oxide; about 2 to about 20 wt % reactive silica; about 3 to about 20 wt % of a component including peptizable boehmite, colloidal silica, aluminum chlorohydrol, or a combination of any two or more thereof; and about 10 to about 50 wt % of kaolin.

Cracking of the hydrocarbon feed according to the methods described herein results in at least 10% lower coke yield at 13 wt % bottoms, when compared to contacting the feed with a catalyst having equivalent physical properties which does not include the bottoms cracking catalyst.

In some embodiments, the method of cracking a hydrocarbon feed includes a bottoms cracking catalyst that is zeolite-free.

In another aspect a bottoms cracking catalyst composition includes a rare earth exchanged Y zeolite. In such embodiments, the rare earth element may be ytterbium, gadolinium, cerium, lanthanum, yttrium, or a mixture of any two or more thereof. The composition may include about 10 to about 20 wt % of the rare earth exchanged Y zeolite; about 10 to about 30 wt % of a binder comprising silica and boehmite; about 30 to about 60 wt % of an additive comprising alumina and, optionally, crystalline boehmite; and about 10 to about 50 wt % of kaolin.

The bottoms cracking catalyst composition includes about 30 to about 60 wt % alumina. This may include, but is not limited to, about 30 wt %, about 35 wt %, about 40 wt %, about 45 wt %, about 50 wt %, about 55 wt %, about 60 wt %, or a range between any two of these values. In some embodiments, the amount of alumina includes from about 30 to about 60 wt. %, from about 35 to about 55 wt %, from about 40 to about 55 wt %, or from about 45 to about 55 wt %. Suitable types of alumina include, but are not limited to, $\gamma\text{-}Al_2O_3$, $\eta\text{-}Al_2O_3$, $\delta\text{-}Al_2O_3$, $\theta\text{-}Al_2O_3$, $\kappa\text{-}Al_2O_3$, and a combination of any two or more thereof.

In some embodiments, the bottoms cracking catalyst composition includes about 2 to about 20 wt % reactive silica. For example, suitable amounts of reactive silica include, but are not limited to, about 2 to about 20 wt %, about 5 to 15 wt %, or about 7 to about 12 wt %. Suitable types of reactive silica include, but is not limited to, colloidal silica, precipitated $SiO_2$, $SiO_2$ gel, high surface area silica that can volatilize, zeolites, or combinations of two or more thereof. Without being bound by theory, it is believed that the reactive silica provides, the Si needed to create Brönsted acid sites, while reducing, or eliminating, the Lewis acid sites that make coke.

The bottoms cracking catalyst composition includes about 3 wt % to about 20 wt % of a component that includes peptizable boehmite, colloidal silica, aluminum chlorohydrol, or a combination of any two or more thereof. In some embodiments, the component is colloidal silica and peptizable boehmite. Suitable amounts of the component include, but are not limited to, about 3 wt %, about 5 wt %, about 7 wt %, about 10 wt %, about 12 wt %, about 15 wt %, about 18 wt %, about 20 wt %, or a range between any of these values. In some embodiments, the component is present in an amount from about 3 to about 18 wt %, about 5 to about 15 wt %, about 7 to about 12 wt %.

The bottoms cracking catalyst composition includes about 10 wt % to about 50 wt % of kaolin. For example, suitable amounts of kaolin include, but are not limited to, about 10 wt %, about 15 wt %, about 20 wt %, about 25 wt %, about 30 wt %, about 35 wt %, about 40 wt %, about 45 wt %, about 50 wt %, or ranges between any two of these values. In some embodiments, the amount of kaolin present includes from about 10 to about 50 wt %, about 15 to about 45 wt %, or about 20 to about 30 wt %. In some embodiments, the kaolin includes metakaolin (kaolin calcined to undergo a strong endothermic reaction associated with dehydroxylation) and kaolin calcined under conditions more severe than those used to convert kaolin to metakaolin, i.e., kaolin calcined to undergo the characteristic kaolin exothermic reaction, sometimes referred to as the spinel form of calcined kaolin.

The bottoms cracking catalyst composition described herein in any embodiment has an average particle size of about 70 to about 95 microns. For example, suitable particle sizes include, but are not limited to, about 70 microns, about 75 microns, about 80 microns, about 85 microns, about 90 microns, about 95 microns, and ranges between any two of these values. In some embodiments, the particle size includes from about 70 to about 95 microns, about 70 to about 85 microns, or about 70 to about 80 microns.

The bottoms cracking catalyst composition described herein in any embodiment may have a mercury pore volume of 0.3 to 0.56 cc/g in a diameter range from 4 to 2,000 nm. For example, suitable mercury pore volume amounts include 0.30 cc/g, 0.35 cc/g, 0.40 cc/g, 0.45 cc/g, 0.50 cc/g, 0.56 cc/g, or ranges between any two of these values. In some embodiments the mercury pore volume includes amounts from 0.3 to 0.56 cc/g, from 0.40 to 0.56 cc/g, or 0.45 to 0.56 cc/g.

Where the bottoms cracking catalyst contains a rare earth exchanged Y zeolite, the catalyst may have a BET surface area from about 200 to about 350 $m^2/g$. For example, the BET surface area includes, but is not limited to, from about 220 to about 320 m2/g, about 225 to about 310 m2/g, or about 230 to about 300 m2/g.

With respect to the binder constituents, colloidal silica and peptizable pseudo-boehmite may be used such as Catapal or Disperal products for the boehmite, and small particle size colloidal silica or polysilicic acid for the colloidal silica, the former otherwise known as ammonium polysilicate. It is known that for these colloidal or polymeric species, small particle size is preferred. For the $SiO_2$, less than 50 Å is preferred, and most preferred is freshly prepared (poly)silicic acid. The foregoing binder system is advantageous in that it is essentially free of sodium and the like. Accordingly, in any of the above embodiments, the compositions may be essentially free of, or free of sodium. As used herein, essentially free of sodium will refer to compositions with less than 0.5 wt % sodium. It is also well known in the art to bind FCC catalysts with aluminum-stabilized colloidal silica prepared by rapidly mixing together sodium silicate and alum in sulfuric acid, but this system contains sodium and so is less preferred, but does contain silica, and thus can be expected to function equivalently to the most preferred composition.

More generally, since the preferred binder system contains no sodium, ion exchange and other processes can be avoided and the (calcined) spray dryer product is a final product. This means that the inventive catalyst is a useful vehicle for incorporating other known functionalities commonly used in catalytic cracking. Thus, minor amounts of rare earth- or alkaline earth-based vanadium traps, or of refractory oxide-supported precious metal CO oxidation or NOx reduction catalysts and oxygen storage compounds already known for washcoating onto monolithic supports for emission controls, or minor amounts of known $SO_x$ oxidation or adsorbents all can be added to the current formulation to obtain results as expected by one skilled in the art.

In another aspect, a method of making bottoms cracking catalyst as described herein in any embodiment is provided. The method of making a bottom cracking catalyst includes forming an aqueous slurry containing on a dry weight basis, about 30 to about 60 wt % alumina; greater than 0 to about 10 wt % of a rare earth carbonate; about 2 to about 20 wt % reactive silica; about 3 to about 20 wt % of a component that includes peptizable boehmite, colloidal silica, aluminum chlorohydrol, or a combination of any two or more thereof; and about 10 to about 50 wt % of kaolin, and spray drying the aqueous slurry to obtain microspheres. In some embodiments, the dopant is doped onto the alumina, while in others the dopant is mixed with the alumina. Further, the alumina, in some embodiments, may be a calcined alumina.

The methods described herein include forming the aqueous slurry containing alumina, the rare earth carbonate, reactive silica, a component that includes peptizable boehmite, colloidal silica, aluminum chlorohydrol, or a combination of any two or more thereof, and kaolin as described herein in any embodiment. For example, forming the aqueous slurry may include wet milling the alumina to improve attrition resistance.

Other granular ingredients, may also be milled. A combination of granular ingredients may be pre-mixed and then milled together. In some embodiments, suitable milling particle size targets include 90% below 3 microns. Typically, gibbsite, bayerite and calcined aluminas are easily milled. Peptizable or partially peptizable boehmites may be difficult or unnecessary to mill. In some embodiments, peptizing of boehmites or pseudo-boehmites will arrive at the particle size target, including but not limited to, 90% below 3 microns. In some embodiments, the individual components may be made down and milled together or separately, and mixed easily in any order at acidic pH. In some embodiments, the method includes adding colloidal $SiO_2$ last. For example, the colloidal $SiO_2$ may have a basic pH, and thus react with peptized alumina in the slurry. In some instances, the slurry thickens and may gel as the $SiO_2$ raises the overall pH of the mixture. In some embodiments, the colloidal $SiO_2$ is Nalco 2326 $SiO_2$, and the peptizable boehmite is PB-950 Catapal A, or Catapal B.

In some embodiments, the forming is conducted at acidic pH conditions. In some embodiments, the forming is conducted at about pH 5, about pH 4, about pH 3, about pH 2.5, about pH 2, or ranges between any two of these values.

In some embodiments, forming the aqueous slurry is conducted at a temperature of at least about 10° C. For example, suitable temperatures include, but are not limited to, about 10° C., 15° C., 20° C., 25° C., 30° C., 35° C., 40° C., 45° C., 50° C., 55° C., 60° C., 65° C., 70° C., 75° C., 80° C., 85° C., 90° C., 95° C., or 100° C., or ranges between any two of these values.

Following formation of the aqueous slurry, the method includes spray drying the aqueous slurry to obtain microspheres. In some embodiments, the microspheres include a particle size, BET surface area, and/or a mercury pore volume as described herein in any embodiment. For example, the microspheres include a particle size from about 70 to about 95 microns, a BET surface area from about 100 to about 200 $m^2/g$, and a mercury pore volume from 0.3 to 0.56 cc/g. Where the bottoms cracking catalyst contains a rare earth exchanged Y zeolite, the catalyst may have a BET surface area from about 200 to about 350 $m^2/g$. For example, the BET surface area includes, but is not limited to, from about 220 to about 320 m2/g, about 225 to about 310 m2/g, or about 230 to about 300 m2/g.

The methods described herein may further include static calcination of the microspheres. In some embodiments, the calcining is conducted at a temperature from about 400° C. to about 850° C. Suitable temperatures for calcining the microspheres includes, but are not limited to, the calcining is conducted at a temperature of from about 400° C. to about 850° C., from about 480° C. to about 740° C., from about 500° C. to about 650° C., or from about 600° C. to about 700° C. In some embodiments, the calcining is conducted at a temperature of about 400° C., 500° C., 525° C., 550° C., 575° C., 600° C., 625° C., 650° C., 675° C., 700° C., 725° C., 750° C., 775° C., 800° C., 825° C., or 850° C., or ranges between any two of these values.

In some embodiments, the static calcination is conducted for at least about 15 minutes ("min"). For example, suitable periods for calcining include, but are not limited to at least about 15 min, at least about 30 min, at least about 1 hour, or at least about 2 hours. In some embodiments, the calcining is conducted from about 15 min to about 5 hours, about 45 min to about 3 hours, or about 1 hour to about 2 hours.

In some embodiments, the calcination is conducted in a rotary calciner. Rotary calcination may include residence times from about 1 min to about 1 hour. For example, suitable rotary calcination residence times include, but are not limited to about 1 min to about 1 hour, about 5 min to about 30 min, about 10 min to about 20 min. Rotary calcination may be carried out at temperatures described herein for static calcination. For example, suitable rotary calcination temperatures may be from about 400° C. to about 850° C., from about 480° C. to about 740° C., from about 500° C. to about 650° C., or from about 600° C. to about 700° C.

In another related aspect, a method of cracking a hydrocarbon feed is provided that includes contacting said feed with a bottoms cracking catalyst. Any of the bottoms cracking catalysts described herein in any embodiment can be used in the catalytic cracking of the hydrocarbon feed.

The method of cracking a hydrocarbon feed includes contacting said hydrocarbon feed with a bottoms cracking catalyst that includes about 30 to about 60 wt % alumina; greater than 0 to about 10 wt % of a rare earth carbonate, measured as the oxide; about 2 to about 20 wt % reactive silica; about 3 to about 20 wt % of a component including peptizable boehmite, colloidal silica, aluminum chlorohydrol, or a combination of any two or more thereof; and about 10 to about 50 wt % of kaolin.

Cracking of the hydrocarbon feed according to the methods described herein results in at least 10% lower coke yield at 13 wt % bottoms, when compared to contacting the feed with a catalyst having equivalent physical properties which does not include the bottoms cracking catalyst.

The present technology, thus generally described, will be understood more readily by reference to the following examples, which are provided by way of illustration and are not intended to be limiting of the present technology.

EXAMPLES

Example 1

Sample catalysts (A-E) were prepared as an alumina loading ladder according to the following: lanthanum-stabilized alumina matrix was wet milled 90%<~3 μm and then spray dried with 15 wt % VF colloidal $SiO_2$ sol and 6.5% VF peptized pseudo-boehmite binder system, each on a volatilefree (VF) basis. The balance of the formulation was made up by alpha alumina and kaolin, as listed in Table 1. The alumina was milled without pH adjustment but in some cases is adjusted to 4-5 pH after milling to reduce viscosity. Peptization of the pseudo-boehmites was performed as directed by the manufacturer with aging periods of several hours or preferably overnight. Commercial colloidal silica was used as received and added slowly as the last component to the combined slurry. Other ingredients were combined in the order listed in Table 1. Spray drying was conducted on a pressure-atomizing single fluid nozzle dryer with the slurry solids at about 20 wt %. The sample catalysts were calcined at 1300° F. and steam deactivated at 1450° F. for 24 hours. Formulations for the exemplary catalysts A-E and properties are provided in Table 1. A comparative catalyst (F) was prepared according to the procedure described above having typical properties for alternative inert kaolin activity-adjusting microspheres. Samples C, D, and E gave high surface area along with acceptable bulk density and attrition resistance.

Example 2

Catalytic evaluation of Catalyst Blends. Catalytic evaluations of catalyst blends were made to evaluate the effect that modifying only the bulk physical and chemical properties of the catalyst blends have on catalytic performance. Table 2 shows ACE testing formulations for exemplary catalyst blends that include the bottoms cracking catalyst composition (Sample D) as described in Example 1. Sample D was blended with commercially-available clay-based in situ zeolitic components of relatively higher steamed ZSA/MSA (SZ/M) so as to match the lower SZ/M of other clay-based in situ zeolitic components. In the case of the 0.25 SZ/M target, no clay-based in situ control was available, so Comparative blend 5 also contained 44% of Sample D, while the corresponding Example Blend 6 contained an 78% of Sample D. All of the catalysts were steamed separately at 1450° F. for 24 hours, and then blended as described for the ACE testing. The blends were prepared at constant total surface area (TSA), ABD, and at three levels of SZ/M (Table 2). Only the clay-based in situ zeolite components contained zeolite. Inert kaolin activity-adjusting microspheres of higher (Clay MS, Comparative F in Table 1) and lower densities were used to equalize blended surface areas and bulk densities. With the blend properties matched very well, it would be surprising to find any performance differences.

TABLE 1

Formulations

| Sample Catalysts | A | B | C | D | E | F |
|---|---|---|---|---|---|---|
| La-stabilized $Al_2O_3$ loading, wt % VF | 20% | 40% | 40% | 50% | 60% | 0% |
| Clay loading, wt % VF | 50% | 30% | 30% | 20% | 10% | 100% |
| Peptizable boehmite, wt % VF | 6.50% | 6.50% | 6.50% | 6.50% | 6.50% | 0% |
| Alpha alumina loading, wt % VF | 8.50% | 8.50% | 8.50% | 8.50% | 8.50% | 0% |
| Colloidal $SiO_2$, wt % VF | 15% | 15% | 15% | 15% | 15% | 0% |
| Properties after calcination at | | | 1300° F. | | | >2000° F. |
| BET $m^2/g$ | 93 | 153 | 150 | 169 | 173 | <10 |
| ABD, g/mL | 0.73 | 0.67 | 0.66 | 0.63 | 0.62 | 1.0 |
| AJAR, wt %/hr | 1.03 | 1.37 | 1.22 | 2.09 | 2.58 | <4 |
| AJI (0-5 hour loss) wt % | 6.04 | 8.16 | 7.50 | 12.1 | 14.1 | <30 |
| D50, μm | 99 | 89 | 98 | 96 | 95 | 80 |
| HgTPV, cc/g | 0.409 | 0.475 | 0.5 | 0.534 | 0.552 | <0.2 |
| $SiO_2$, wt % | 37.0 | 27.0 | 25.8 | 21.4 | 17.1 | 52 |
| $Al_2O_3$, wt % | 60.4 | 70.6 | 71.6 | 76.1 | 80.5 | 44 |
| $Na_2O$, wt % | 0.062 | — | — | — | — | 0.2 |
| $La_2O_3$, wt % | 0.7 | 1.3 | 1.4 | 1.7 | 1.9 | 0 |
| Steaming at 1450° F./24 hrs | | | | | | |
| BET, $m^2/g$ | 69 | 88 | 88 | 100 | 110 | <5 |
| MSA, $m^2/g$ | 66 | 86 | 85 | 97 | 108 | <5 |

ABD is an abbreviation for apparent (or fall) bulk density, g/mL.
AJAR is an abbreviation for air jet attrition rate between 1 hour and 5 hours by ASTM 5757.
AJI is an abbreviation for air jet index, total wt % loss between 0 hours and 5 hours.
MSA is an abbreviation for matrix surface area.
HgTPV is an abbreviation for total mercury pore volume in the diameter range from 4 to 2,000 nm.

TABLE 2

Comparative and Example Blend Ratios and Properties

| | Catalyst Blend Ratios | | | | | |
|---|---|---|---|---|---|---|
| | Comparative Blends | | | Example Blends | | |
| Blend Components | 1 | 3 | 5 | 2 | 4 | 6 |
| Clay-based in situ (SZ/M) | 59 | 66 | 44 | 59 | 38 | 22 |
| | (1.10) | (0.44) | (0.44) | (2.24) | (1.10) | (1.10) |
| Sample D, wt % | 0 | 0 | 44 | 33 | 46 | 78 |
| Clay MS (0.98 ABD, Sample F) | 21 | 30 | 11 | 4 | 2 | 0 |
| Clay MS (0.52 ABD) | 20 | 4 | 1 | 5 | 14 | 0 |

TABLE 2-continued

Comparative and Example Blend Ratios and Properties

| | Catalyst Blend Ratios | | | | | |
|---|---|---|---|---|---|---|
| | Comparative Blends | | | Example Blends | | |
| Blend Components | 1 | 3 | 5 | 2 | 4 | 6 |
| Calculated Blend Properties, steamed 1450° F./24 hours | | | | | | |
| BET | 130 | 130 | 130 | 130 | 130 | 126 |
| MSA, m$^2$/g | 64 | 91 | 104 | 63 | 87 | 101 |
| Z/M | 1.05 | 0.43 | 0.25 | 1.06 | 0.5 | 0.25 |
| ABD | 0.71 | 0.69 | 0.69 | 0.69 | 0.71 | 0.67 |

Figure 2:
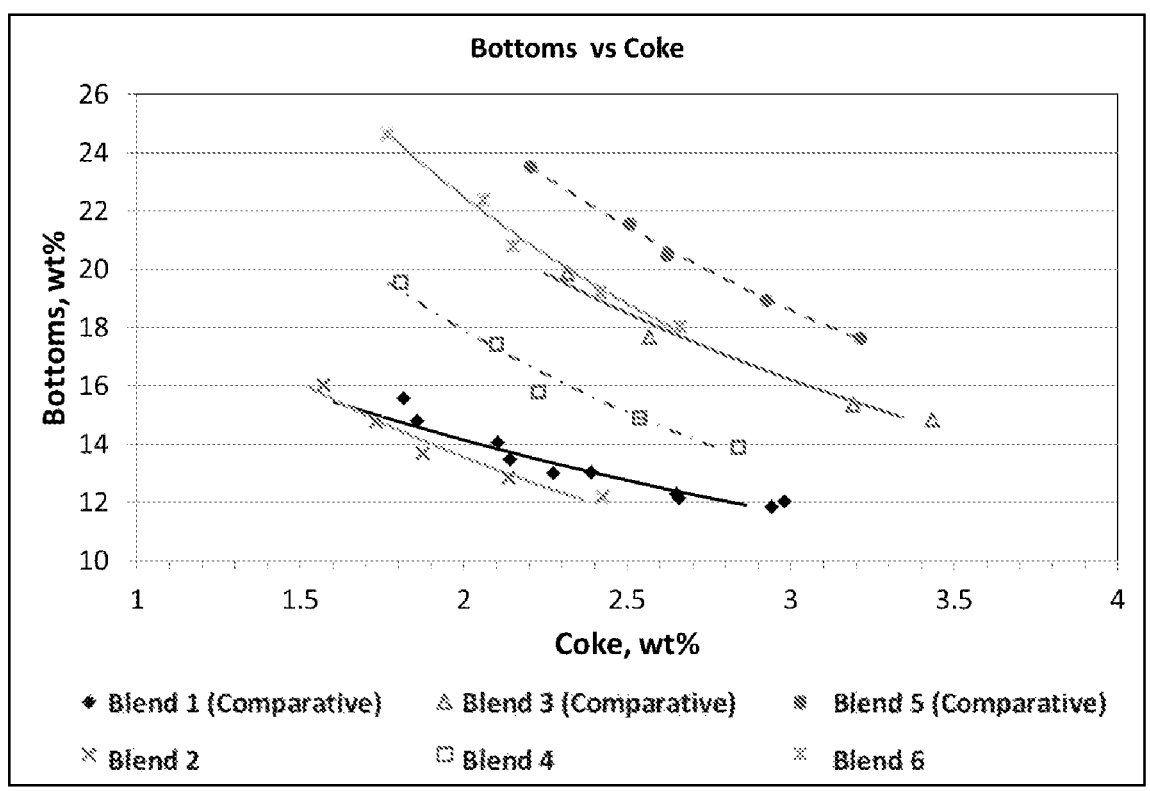
FIG. 2 is a graph of bottoms as a function of coke production for the illustrative and comparative catalyst blends described in Example 2.
Figure 3:
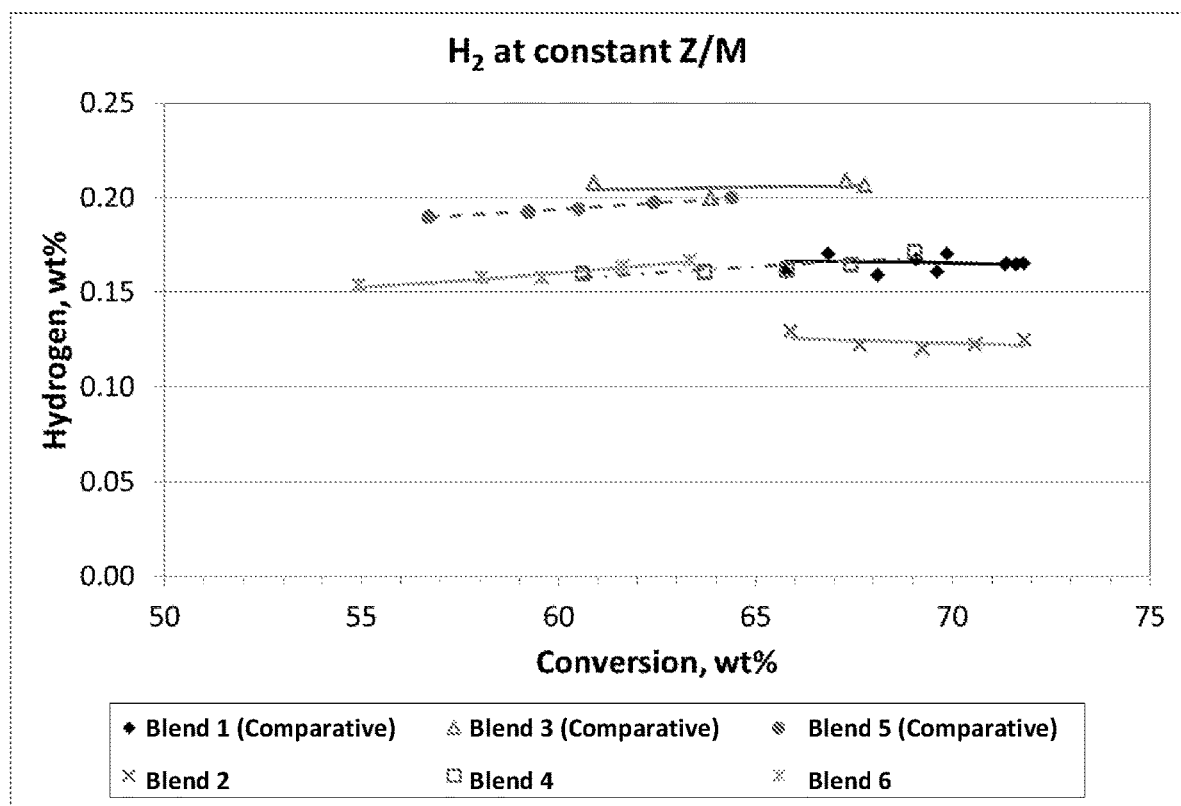
FIG. 3 is a graph of hydrogen production as a function of product conversion for the illustrative and comparative catalyst blends described in Example 2.
Figure 4:
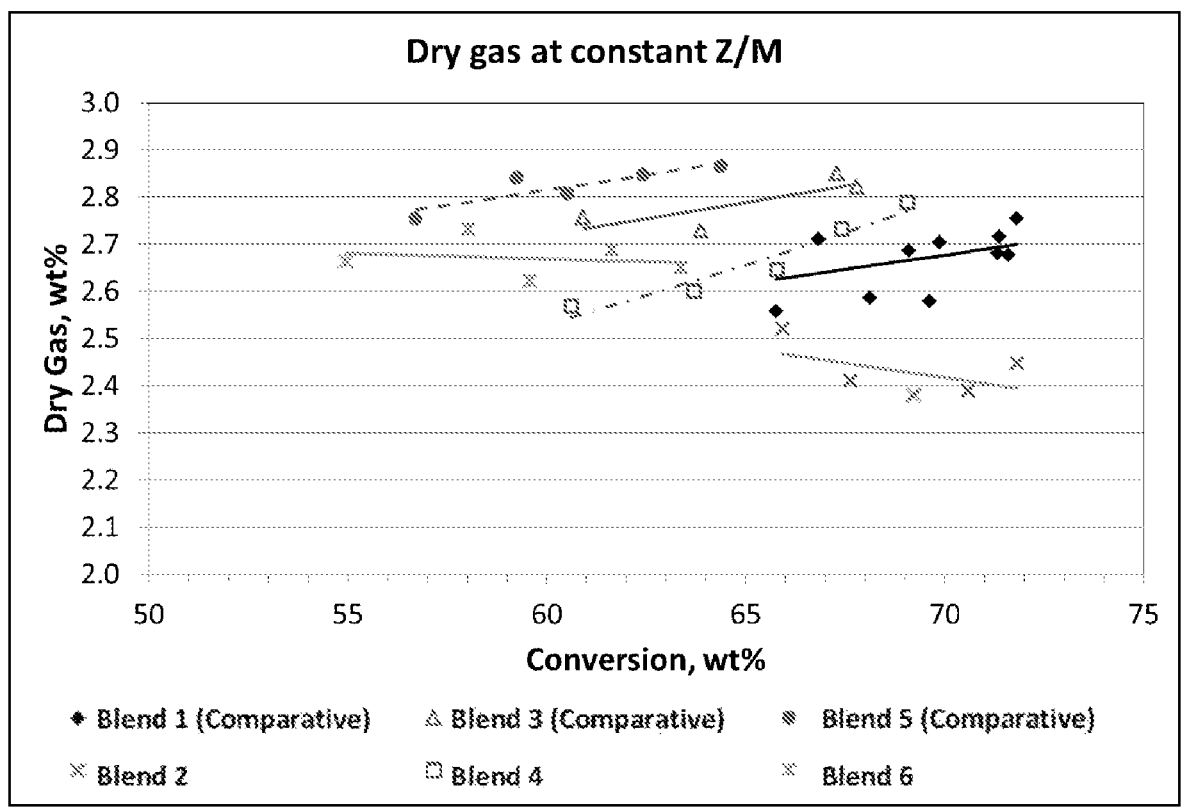
FIG. 4 is a graph of dry gas production as a function of product conversion for the illustrative and comparative catalyst blends described in Example 2.
Figure 5:
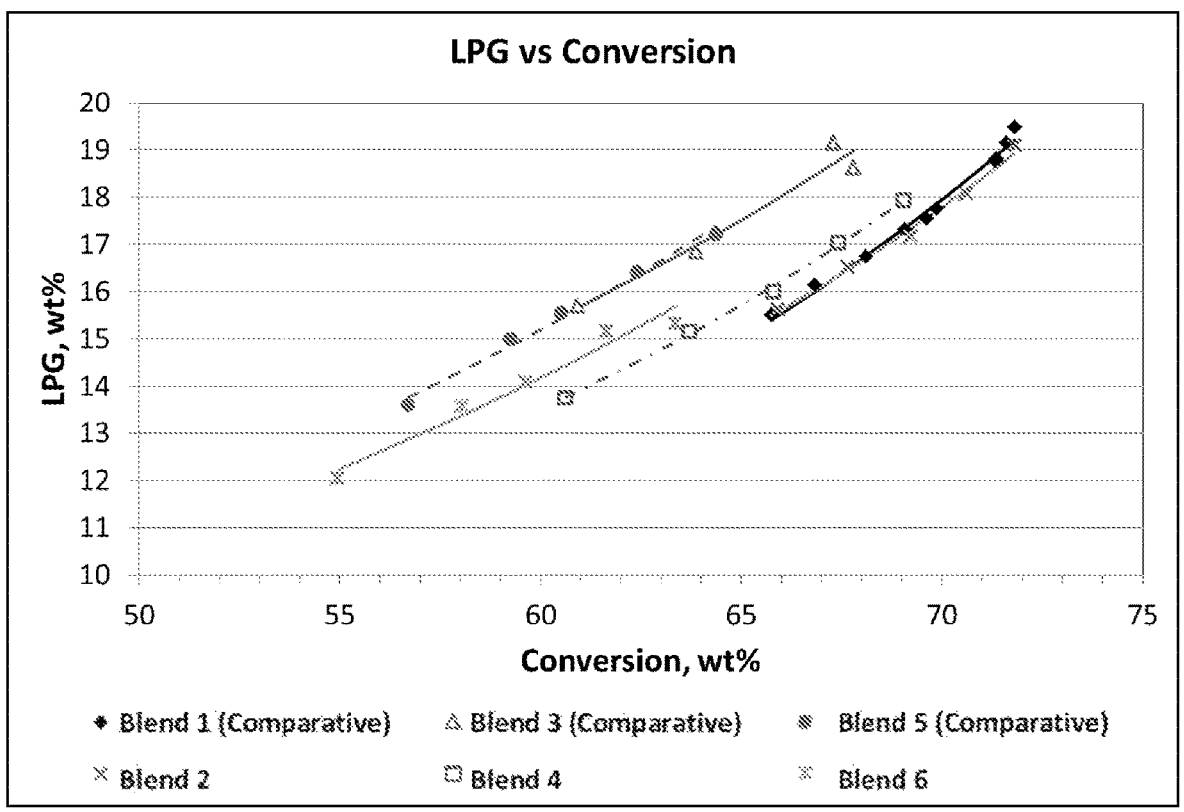
FIG. 5 is a graph of liquid petroleum gas (LPG) production as a function of product conversion for the illustrative and comparative catalyst blends described in Example 2.
Figure 6:
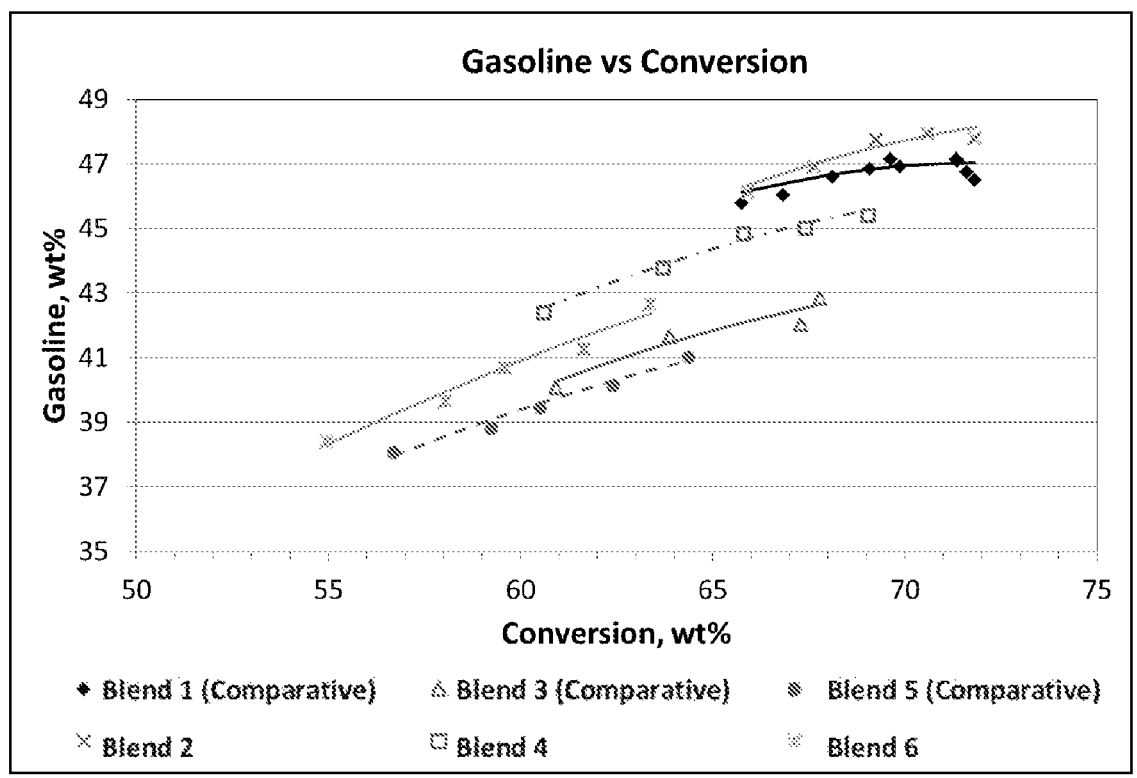
FIG. 6 is a graph of gasoline production as a function of product conversion for the illustrative and comparative catalyst blends described in Example 2.

Example and comparative catalyst blends were evaluated using an Advanced Catalyst Evaluation (ACE) fluid bed. FIG. 1 shows that the example catalyst blends (Blends 2, 4, and 6) and comparative catalyst blends (1, 3, and 5) have about the same activity. The ACE results in Table 3 demonstrate 11-24% coke reductions at constant bottoms for the example compositions as compared to the comparative examples. Specifically, the example catalyst blends having the Sample D catalyst (Example 1) exhibited 11%, 24%, and 15% lower coke selectivity than the comparative catalyst blends (FIG. 2) at 13 wt %, 17 wt %, and 20 wt % bottoms yield. FIG. 2 and Table 3 further show the relative coke reductions at differing bottoms conversions because the activity of the catalysts changes when SZ/M is changed. The steamed unit cell sizes (SUCS) were equivalent for comparative blend 1 and example blends 4 and 6 (24.33 Å) and comparative blend 3 (24.32 Å), but showed a difference for example blend 2 (24.27 Å). The low SUCS indicated low zeolite activity, pushing down the Z/M activity ratio, and potentially increasing coke selectivity. As such, this difference in SUCS between Example Blend 2 and Comparative Blend 1 explains the smaller difference in benefit.

Figure 7:
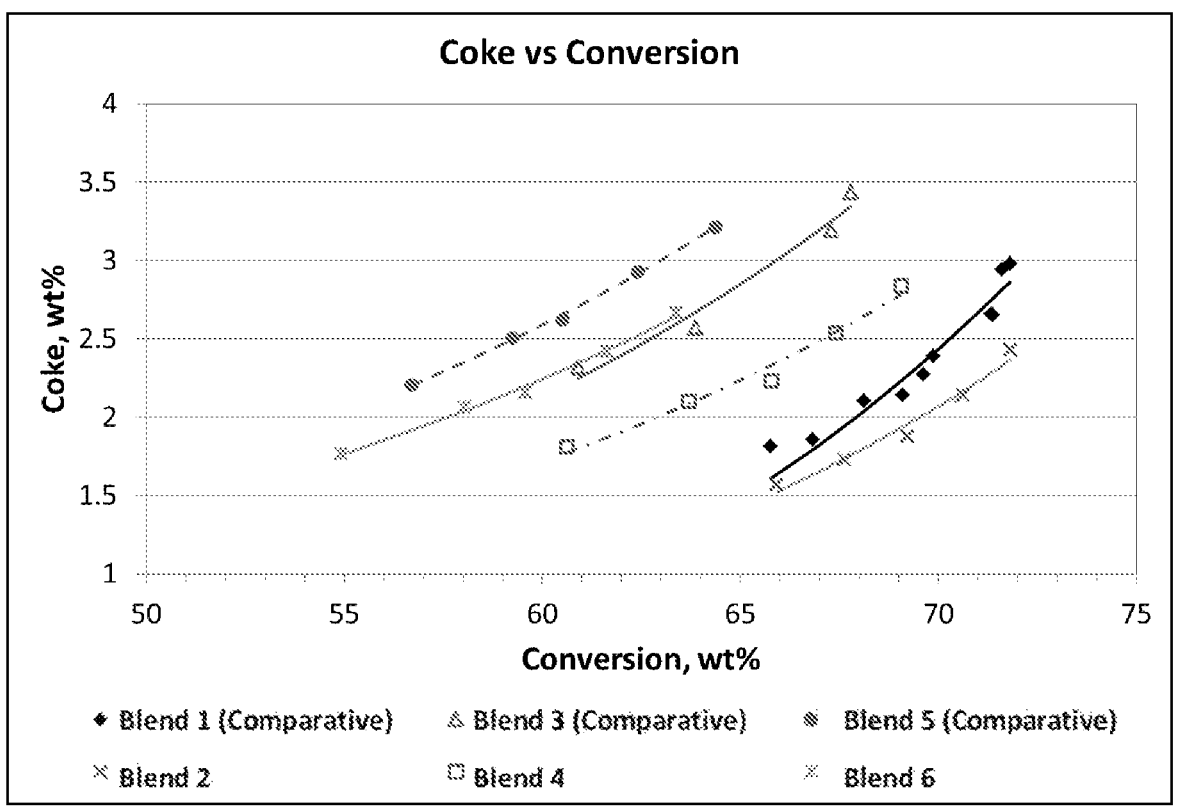
FIG. 7 is a graph of coke production as a function of product conversion for the illustrative and comparative catalyst blends described in Example 2.
Figure 8:
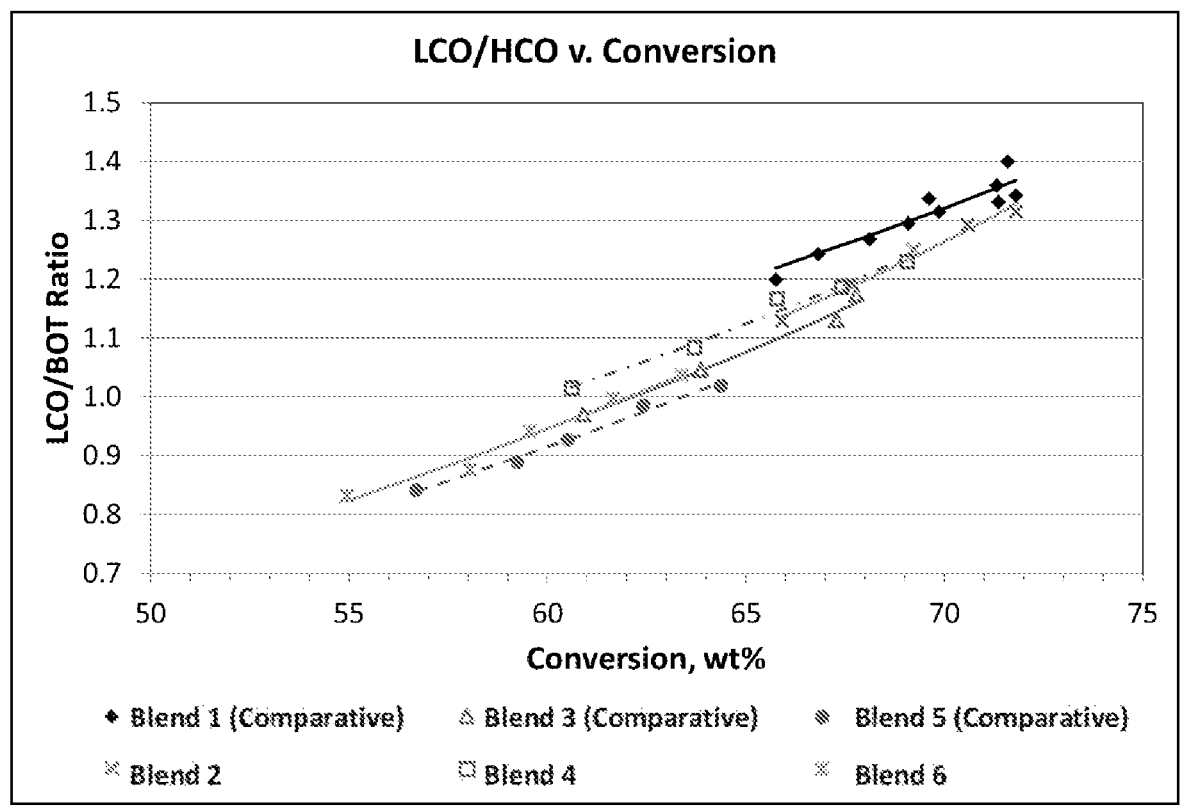
FIG. 8 is a graph of the light cycle oil (LCO) production to bottoms conversion ratio as a function of coke selectivity for the illustrative and comparative catalyst blends described in Example 2.

FIG. 3, FIG. 4, FIG. 5, FIG. 6, FIG. 7, and FIG. 8 demonstrate the yield of different products, LCO, Hz, dry gas, liquid petroleum gas (LPG), and gasoline, respectively. As seen in the figures, example catalyst blends having Sample D catalyst (Blends 2, 4, and 6) exhibited up to 2% higher gasoline production and lower LPG, H$_2$, and dry gas production. FIG. 7 shows that while coke increases systematically as SZ/M is reduced for the comparative blends (Blends 1, 3, and 5); the coke increase is less using the catalyst of the present technology. In other words, the exemplary catalyst blends (2, 4, and 6) increase conversion at constant coke and SZ/M, owing improved coke selectivity. FIG. 8 shows that the ratio of LCO production over bottoms conversion increases by 2% (Z/M=1.06), 15% (Z/M=0.5), and 12% (Z/M=0.25) at constant coke yield of 2.5 wt %.

TABLE 3

Comparison of Comparative to Example Blends.

| | Comparative Blends | | |
|---|---|---|---|
| | Blend 1 | Blend 3 | Blend 5 |
| | Example Blends | | |
| | Blend 2 | Blend 4 | Blend 6 |
| Wt % Bottoms | 13.00 | 17.00 | 20.00 |
| % lower coke | −11% | −24% | −15% |

Example 3

Bottoms catalyst formulations with a rare earth carbonate and no zeolite. The following table shows the material ranges for forming a bottoms catalyst.

| | Broad range |
|---|---|
| Ingredients | |
| Lanthanum carbonate (or cerium carbonate) | >0-10 wt % |
| SiO$_2$ binder | 2-20 wt % |
| Peptizable boehmite PB-950 | 3-15 wt % |
| Alpha Alumina | 0-20 wt % |
| Kaolin | 10-50 wt % |
| Properties | |
| BET surface area, fresh | 100-200 m$^2$/g |
| HgTPV, 40-20,000 A diameter | 0.41-0.55 mL/g |
| Average particle size | 70-95 microns |
| Na$_2$O | <0.2 wt % |

Example 4

Bottoms catalyst formulations based upon a rare earth exchanged Y zeolite.

| Rare earth exchanged Y zeolite | 15.0% |
|---|---|
| N1 | 40.0% |
| Nalco 2326 | 15.0% |
| PB950-peptized | 6.5% |
| Crystalline Boehmite | 10% |
| Hydrous kaolin | 13.5% |

Para. A1. A bottoms cracking catalyst composition, comprising: about 30 to about 60 wt % alumina; greater than 0 to about 10 wt % of a dopant comprising ytterbium, gadolinium, cerium, lanthanum, yttrium, barium, magnesium, or a mixture of any two or more thereof, measured as the oxide; about 2 to about 20 wt % reactive silica; about 3 to about 20 wt % of a component comprising peptizable boehmite, colloidal silica, aluminum chlorohydrol, or a combination of any two or more thereof; and about 10 to about 50 wt % of kaolin. In some embodiments, the dopant is doped onto the alumina, while in others the dopant is mixed with the alumina. Further, the alumina, in some embodiments, may be a calcined alumina.

Para. A2. The catalyst of Para. A1, comprising the dopant is present in an amount of about 0.1 to about 5 wt % of the composition, measured as the oxide.

Para. A3. The catalyst of any one of Paras. A1 or A2, wherein the dopant is present in an amount of about 4 wt %.

Para. A4. The catalyst of Para. A1, wherein the dopant comprises lanthanum.

Para. A5. The catalyst of any one of Paras. A1 to A4, wherein the dopant is impregnated into the alumina or coated onto the alumina or co-precipitated with the alumina.

Para. A6. The catalyst of any one of Paras. A1 to A5, having an average particle size of about 70-95 microns.

Para. A7. The catalyst of any one of Paras A1 to A6, having a mercury pore volume of 0.3-0.56 cc/g in a diameter range from 4 to 2,000 nm.

Para. A8. The catalyst of any one of Paras. A1 to A7 further comprising a zeolite in the composition.

Para. A9. The catalyst of Para. A8, wherein the zeolite is Y zeolite.

Para. A10. The catalyst of any one of Paras. A1 to A8 which is zeolite-free.

Para. A10a. The catalyst of any one of Paras. A1 to A10, wherein the alumina is a calcined alumina.

Para. A11. A method of making bottoms cracking catalyst, comprising forming an aqueous slurry containing on a dry weight basis,
 about 30 to about 60 wt % alumina;
 greater than 0 to about 10 wt % of a dopant comprising ytterbium, gadolinium, cerium, lanthanum, yttrium, barium, magnesium, or a mixture of any two or more thereof, measured as the oxide;
 about 2 to about 20 wt % reactive silica;
 about 3 to about 20 wt % of a component comprising peptizable boehmite, colloidal silica, aluminum chlorohydrol, or a combination of any two or more thereof; and
 about 10 to about 50 wt % of kaolin, and spray drying the aqueous slurry to obtain microspheres.

Para. A12. The method of Para. A11, further comprising calcining the microspheres.

Para. A13. A method of cracking a hydrocarbon feed comprising contacting said feed with a fluid catalytic cracking (FCC) catalyst comprising a zeolitic component and a bottoms cracking catalyst, the bottoms cracking catalyst comprising:
 about 30 to about 60 wt % alumina;
 greater than 0 to about 10 wt % of a dopant comprising ytterbium, gadolinium, cerium, lanthanum, yttrium, barium, magnesium, or a mixture of any two or more thereof, measured as the oxide with respect to the alumina;
 about 2 to about 20 wt % reactive silica;
 about 3 to about 20 wt % of a component comprising peptizable boehmite, colloidal silica, aluminum chlorohydrol, or a combination of any two or more thereof; and
 about 10 to about 50 wt % of kaolin.

Para. A14. The method of Para. A13, wherein the catalyst comprises the dopant in an amount of about 0.1 to about 5 wt %, measured as the oxide.

Para. A15. The method of Para. A13, wherein the rare earth element comprises lanthanum.

Para. A16. The method of any one of Paras. A13 to 1A5, wherein the method results in greater than 10% lower coke yield measured at 13 wt % bottoms, when compared to contacting the feed with a catalyst having the same physical properties which does not include the bottoms cracking catalyst.

Para. A17. The method of any one of Paras. A13-1A6, wherein the zeolite comprises a Y zeolite.

Para. A19. The method of any one of Paras. A13-A16, wherein the FCC catalyst comprises at least 15 wt % of the bottoms cracking catalyst.

Para. A20. The method of Para. A19, wherein the FCC catalyst comprises at least 50 wt % of the zeolitic component.

Para. A21. The method of any one of Paras. A13-A16, wherein the FCC catalyst comprises 15 wt % to 50 wt % of the bottoms cracking catalyst, or wherein the FCC catalyst comprises 85 wt % to 50 wt % of the zeolitic component.

Para. A22. The method of any one of Paras. A13-A16, wherein the FCC catalyst comprises 15 wt % to 80 wt % of the bottoms cracking catalyst and 85 wt % to 20 wt % of the zeolite and optionally other clay-based components.

Para. A23. The method of any one of Paras. A13-A22 wherein the FCC catalyst further comprises a vanadium trap, or a crystalline boehmite nickel trap.

Para. A25. A bottoms cracking catalyst composition, comprising:
 about 30 to about 60 wt % alumina;
 greater than 0 to about 10 wt % of a rare earth carbonate comprising ytterbium carbonate, gadolinium carbonate, cerium carbonate, lanthanum carbonate, yttrium carbonate, or a mixture of any two or more thereof, measured as the oxide;
 about 2 to about 20 wt % reactive silica;
 about 3 to about 20 wt % of a component comprising peptizable boehmite, colloidal silica, aluminum chlorohydrol, or a combination of any two or more thereof; and
 about 10 to about 50 wt % of kaolin.

Para. A26. The catalyst of Para. 25, comprising the rare earth carbonate is present in an amount of about 0.1 to about 5 wt % of the composition.

Para. A27. The catalyst of any one of Paras. A25 or A26, wherein the rare earth carbonate is present in an amount of about 4 wt %.

Para. A28. The catalyst of any one of Paras. A25 to A27, wherein the rare earth element comprises lanthanum.

Para. A29. The catalyst of any one of Paras. A25 to A28, having an average particle size of about 70-95 microns.

Para. A30. The catalyst of any one of Paras. A25 to A29, having a mercury pore volume of 0.3-0.56 cc/g in a diameter range from 4 to 2,000 nm.

Para. A31. A bottoms cracking catalyst composition, comprising:
 about 10 to about 20 wt % of a rare earth exchanged Y zeolite;
 about 10 to about 30 wt % of a binder comprising silica and boehmite;
 about 30 to about 60 wt % of an additive comprising alumina and, optionally, crystalline boehmite; and
 about 10 to about 50 wt % of kaolin.

Para. A32. The bottoms cracking catalyst composition of Para. A31, wherein the rare earth exchanged Y zeolite comprises ytterbium, gadolinium, cerium, lanthanum, yttrium, or a mixture of any two or more thereof.

Para. A33. The bottoms cracking catalyst composition Paras. A31 or A32, wherein the rare earth exchanged Y zeolite comprises lanthanum.

Para. A34. The bottoms cracking catalyst composition Paras. A31, A32, or A33 having an average particle size of about 70-95 microns.

Para. A35. The bottoms cracking catalyst composition of any one of Paras. A31 to A34, having a mercury pore volume of 0.3-0.56 cc/g in a diameter range from 4 to 2,000 nm.

Para. A36. A method of making bottoms cracking catalyst, the method comprising:
forming an aqueous slurry containing on a dry weight basis,
about 10 to about 20 wt % of a rare earth exchanged Y zeolite;
about 10 to about 30 wt % of a binder comprising silica and boehmite;
about 30 to about 60 wt % of an additive comprising alumina and, optionally, crystalline boehmite; and
about 10 to about 50 wt % of kaolin; and spray-drying the aqueous slurry to obtain microspheres.

Para. A37. The method of Para. A36 further comprising calcining the microspheres.

Para. A38. The method of Para. A36 or A37, wherein the Y zeolite is exchanged with about 1 to 10 wt % of the rare earth.

Para. A39. A method of cracking a hydrocarbon feed comprising contacting said feed with the bottoms cracking catalyst of any one of Paras. A31-A35.

While certain embodiments have been illustrated and described, it should be understood that changes and modifications can be made therein in accordance with ordinary skill in the art without departing from the technology in its broader aspects as defined in the following claims.

The embodiments, illustratively described herein may suitably be practiced in the absence of any element or elements, limitation or limitations, not specifically disclosed herein. Thus, for example, the terms "comprising," "including," "containing," etc. shall be read expansively and without limitation. Additionally, the terms and expressions employed herein have been used as terms of description and not of limitation, and there is no intention in the use of such terms and expressions of excluding any equivalents of the features shown and described or portions thereof, but it is recognized that various modifications are possible within the scope of the claimed technology. Additionally, the phrase "consisting essentially of" will be understood to include those elements specifically recited and those additional elements that do not materially affect the basic and novel characteristics of the claimed technology. The phrase "consisting of" excludes any element not specified.

The present disclosure is not to be limited in terms of the particular embodiments described in this application. Many modifications and variations can be made without departing from its spirit and scope, as will be apparent to those skilled in the art. Functionally equivalent methods and compositions within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds compositions or biological systems, which can of course vary. It is also to be understood that the terminology used herein is for the purpose of describing particular embodiments only, and is not intended to be limiting.

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, particularly in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," "greater than," "less than," and the like, include the number recited and refer to ranges which can be subsequently broken down into subranges as discussed above. Finally, as will be understood by one skilled in the art, a range includes each individual member.

All publications, patent applications, issued patents, and other documents referred to in this specification are herein incorporated by reference as if each individual publication, patent application, issued patent, or other document was specifically and individually indicated to be incorporated by reference in its entirety. Definitions that are contained in text incorporated by reference are excluded to the extent that they contradict definitions in this disclosure.

Other embodiments are set forth in the following claims.

What is claimed is:

1. A bottoms cracking catalyst composition, comprising:
about 30 to about 60 wt % alumina;
greater than 0 to about 10 wt % of a dopant comprising ytterbium, gadolinium, cerium, lanthanum, yttrium, barium, magnesium, or a mixture of any two or more thereof, measured as the oxide;
about 2 to about 20 wt % reactive silica;
about 3 to about 20 wt % of a component comprising peptizable boehmite, colloidal silica, aluminum chlorohydrol, or a combination of any two or more thereof; and
about 10 to about 50 wt % of kaolin.

2. The catalyst of claim 1, wherein the dopant is present in an amount of about 0.1 to about 5 wt % of the composition, measured as the oxide.

3. The catalyst of claim 1, wherein the dopant is present in an amount of about 4 wt %.

4. The catalyst of claim 1, wherein the dopant comprises lanthanum.

5. The catalyst of claim 1, wherein the dopant is impregnated into the alumina, or coated onto the alumina, or the dopant is co-precipitated with the alumina.

6. The catalyst of claim 1, having an average particle size of about 70-95 microns.

7. The catalyst of claim 1, having a mercury pore volume of 0.3-0.56 cc/g in a diameter range from 4 to 2,000 nm.

8. The catalyst of claim 1 further comprising a zeolite in the composition.

9. The catalyst of claim 8, wherein the zeolite is Y zeolite.

10. The catalyst of claim 1 which is zeolite-free.

11. The catalyst of claim 1, wherein the alumina is calcined alumina.

12. A method of making bottoms cracking catalyst, comprising forming an aqueous slurry containing on a dry weight basis,
about 30 to about 60 wt % alumina;
greater than 0 to about 10 wt % of a dopant comprising ytterbium, gadolinium, cerium, lanthanum, yttrium, barium, magnesium, or a mixture of any two or more thereof, measured as the oxide with respect to the alumina;

about 2 to about 20 wt % reactive silica;

about 3 to about 20 wt % of a component comprising peptizable boehmite, colloidal silica, aluminum chlorohydrol, or a combination of any two or more thereof; and about 10 to about 50 wt % of kaolin, and spray drying the aqueous slurry to obtain microspheres.

13. The method of claim 12, further comprising calcining the microspheres.

14. A method of cracking a hydrocarbon feed comprising contacting said feed with a fluid catalytic cracking (FCC) catalyst comprising a zeolitic component and a bottoms cracking catalyst, the bottoms cracking catalyst comprising:

about 30 to about 60 wt % alumina;

greater than 0 to about 10 wt % of a rare earth element that is ytterbium, gadolinium, cerium, lanthanum, yttrium, barium, magnesium, or a mixture of any two or more thereof, measured as the oxide;

about 2 to about 20 wt % reactive silica;

about 3 to about 20 wt % of a component comprising peptizable boehmite, colloidal silica, aluminum chlorohydrol, or a combination of any two or more thereof; and about 10 to about 50 wt % of kaolin.

15. The method of claim 14, wherein the catalyst comprises the dopant in an amount of about 0.1 to about 5 wt %, measured as the oxide.

16. The method of claim 15, wherein the rare earth element includes lanthanum.

17. The method of claim 14, wherein the method results in greater than 10% lower coke yield measured at 13 wt % bottoms, when compared to contacting the feed with a catalyst having the same physical properties which does not include the bottoms cracking catalyst.

18. The method of claim 14, wherein the zeolite comprises a Y zeolite.

19. The method of claim 14, wherein the FCC catalyst comprises 15 wt % to 50 wt % of the bottoms cracking catalyst and 85 wt % to 50 wt % of the zeolitic component and optionally other clay-based components.

20. The method of claim 14 wherein the FCC catalyst further comprises a vanadium trap, or a crystalline boehmite nickel trap.

21. The method of claim 14, wherein the rare earth element is present in a slurry as ytterbium carbonate, gadolinium carbonate, cerium carbonate, lanthanum carbonate, yttrium carbonate, or a mixture of any two or more thereof.

* * * * *